US011267388B2

(12) United States Patent  
Raja et al.

(10) Patent No.: US 11,267,388 B2  
(45) Date of Patent: Mar. 8, 2022

(54) MOBILE OBJECT

(71) Applicant: SUZUKI MOTOR CORPORATION, Hamamatsu (JP)

(72) Inventors: Gopinath Raja, Hamamatsu (JP); Masayoshi Wada, Hamamatsu (JP); Atsushi Domeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 93 days.

(21) Appl. No.: 16/593,052

(22) Filed: Oct. 4, 2019

(65) Prior Publication Data

US 2020/0139874 A1 May 7, 2020

(30) Foreign Application Priority Data

Nov. 1, 2018 (JP) .............................. JP2018-206661

(51) Int. Cl.  
*B60P 3/42* (2006.01)  
*A61G 5/08* (2006.01)  
(Continued)

(52) U.S. Cl.  
CPC ............ *B60P 3/423* (2013.01); *A61G 5/0833* (2016.11); *B62D 21/14* (2013.01); *A61G 5/04* (2013.01)

(58) Field of Classification Search  
CPC ......... A61G 5/04; A61G 5/0833; B60P 3/423; B62D 21/14  
See application file for complete search history.

(56) References Cited

U.S. PATENT DOCUMENTS 3,966,220 A * 6/1976 Forsyth ..................... B60P 3/07  
280/638  
4,128,258 A * 12/1978 Johnson ................. B62D 21/14  
280/46  
(Continued)

FOREIGN PATENT DOCUMENTS

JP   H 10-248879   9/1998  
JP   2000-005239   1/2000  
(Continued)

OTHER PUBLICATIONS

URL: https://www.suzuki.co.jp/release/c/2018/1102/, Nov. 2, 2018, Publisher: Suzuki Motor Corporation.  
(Continued)

*Primary Examiner* — Frank B Vanaman  
(74) *Attorney, Agent, or Firm* — Cozen O'Connor

(57) ABSTRACT

A mobile object according to the present invention includes: a moving base 1, 201, 301 which includes a front base 13, 213, 313 having front wheel 11 and a rear base 14, 214, 314 having rear wheel 12; and a seat 2, 302 which includes a seating part 21 having a seating surface 21a and leg part 22, 322 supporting the seating part 21. The front base 13, 213, 313 and the rear base 14, 214, 314 are movable relative to each other to expand and contract a wheel base H. The seating part 21 is movable backward and forward respectively by movement of the leg part 22, 322 in association with relative movement of the front base 13, 213, 313 and the rear base 14, 214, 314 for expansion and contraction of the wheel base H. Thus, the mobile object can be efficiently used in a folded state, and user-friendliness of the mobile object can be enhanced.

4 Claims, 11 Drawing Sheets

(51) Int. Cl.
*B62D 21/14* (2006.01)
*A61G 5/04* (2013.01)

(56) References Cited

U.S. PATENT DOCUMENTS

| | | | |
|---|---|---|---|
| 4,613,151 A * | 9/1986 | Kielczewski | A61G 5/042 |
| | | | 180/216 |
| 5,782,483 A * | 7/1998 | Rogers | A61G 5/0833 |
| | | | 280/642 |
| 6,530,445 B1 * | 3/2003 | Flowers | B62K 5/025 |
| | | | 180/208 |
| 7,293,625 B2 | 11/2007 | Kumazawa | |
| 8,894,346 B2 | 11/2014 | Lewis | |
| 9,889,874 B1 | 2/2018 | Clause | |
| 2003/0098196 A1 | 5/2003 | Yanaka | |
| 2004/0094999 A1 * | 5/2004 | Volotsenko | A47C 13/00 |
| | | | 297/188.1 |
| 2006/0137931 A1 | 6/2006 | Berg et al. | |
| 2008/0223649 A1 | 9/2008 | Wandeler | |
| 2008/0277190 A1 | 11/2008 | McCord et al. | |
| 2008/0290622 A1 | 11/2008 | Okada | |
| 2010/0084831 A1 * | 4/2010 | Wang | B60N 2/3065 |
| | | | 280/39 |
| 2011/0087416 A1 | 4/2011 | Patmore | |
| 2011/0088961 A1 | 4/2011 | Case et al. | |
| 2014/0083225 A1 | 3/2014 | Downs et al. | |
| 2019/0359246 A1 * | 11/2019 | Lee | B60T 7/06 |

FOREIGN PATENT DOCUMENTS

| | | |
|---|---|---|
| JP | 2001-048497 | 2/2001 |
| JP | 2005-328914 | 12/2005 |
| JP | 2006-103512 | 4/2006 |
| JP | 2009-183407 | 8/2009 |
| JP | 2016-168153 | 9/2016 |

OTHER PUBLICATIONS

Office Action dated Oct. 15, 2021 issued in U.S. Appl. No. 16/837,700.

* cited by examiner

MOBILE OBJECT

TECHNICAL FIELD

The present invention relates to a mobile object which includes: a moving base having a front wheel and a rear wheel; and a seat located on this moving base.

BACKGROUND ART

Conventionally, a mobile object, such as a wheelchair, a cart, or the like is used as moving means for a user, such as the elderly, a person in need of nursing care, or the like. Typically, the mobile object includes: a moving base having a front wheel and a rear wheel; and a seat installed on this moving base, and furthermore, a user can move while the user is seated on the seat of the mobile object. In regard to the mobile object, an electric vehicle, such as an electric wheelchair, an electric cart, or the like, which is capable of self-traveling by a driving means such as a motor, has become widely used. The electric vehicle is also called a "mobility scooter."

It is often the case that in a situation of long-distance movement, the above-mentioned mobile object is conveyed by an automobile. In this case, the mobile object is housed in a small space, such as a trunk of the automobile or the like. In addition, it is often the case that the mobile object is housed in a small space, such as a vestibule entrance or the like. Therefore, the mobile object may be configured so as to be foldable. Specifically, the mobile object may be configured so as to be variable between an unfolded state in which the moving base is expanded in a front-rear direction to be capable of obtaining stability upon self-traveling, and a folded state in which the moving base is contracted in the front-rear direction to be adaptable to be housed in a small space.

As an example of the foldable mobile object, cited is an electric wheelchair including: a vehicle body front part having a front wheel; and a vehicle body rear part having rear wheels and a seat, the electric wheelchair being configured such that in a state in which a seating surface of a seating part of the seat is faced upward and the seating part is fixed in a fixed position with respect to the vehicle body rear part, the vehicle body front part and the vehicle body rear part can move forward and backward relative to each other so as to expand and contract a wheel base between the front wheel and the rear wheels (for example, refer to Patent Literature 1).

CITATION LIST

Patent Literature

[Patent Literature 1] JP H10-248879 A

SUMMARY OF INVENTION

Technical Problem

In the above-described example of the mobile object, in a folded state of the mobile object, the seating part of the seat is fixed in the fixed position with respect to the vehicle body rear part while the seating surface is faced upward so as to merely make the mobile object compact in size. However, the seating part occupies a wide area of the mobile object so as to allow a user to be stably seated thereon, and therefore, it is often the case that when the mobile object in the folded state is used, the abovementioned seating part becomes obstructive. In other words, the above-described mobile object cannot be efficiently used in the folded state. In addition, the mobile object as described above is hardly quick. Therefore, user-friendliness of the mobile object is reduced.

In view of the above circumstances, it is desired that the mobile object can be efficiently used in the folded state and the user-friendliness of the mobile object can be enhanced.

Solution to Problem

To solve the above-described problems, a mobile object according to an aspect includes: a moving base including a front base and a rear base, the front base having a front wheel, the rear base being located rearward with respect to the front base and having a rear wheel; and a seat including a seating part and a leg part and being located on the moving base, the seating part having a seating surface, the leg part supporting the seating part, the mobile object in which the front base and the rear base are configured so as to be movable relative to each other such that a wheel base between the front wheel and the rear wheel can be expanded and contracted, the seating part is configured so as to be moved forward by movement of the leg part associated with relative movement of the front base and the rear base for contraction of the wheel base, and the seating part is further configured so as to be moved backward by movement of the leg part associated with relative movement of the front base and the rear base for expansion of the wheel base.

Advantageous Effects of Invention

A mobile object according to an aspect can be efficiently used in a folded state and user-friendliness of the mobile object can be enhanced.

DESCRIPTION OF EMBODIMENTS

Mobile objects according to First to Fifth Embodiments will be described below. The mobile object may be a single-seater. Furthermore, the mobile object may be configured such that a seat installed thereon is opened to the outside of the mobile object. For example, the mobile object may be a wheelchair, a cart, or the like. In particular, the mobile object may be a single-seater wheelchair, a single-seater cart, or the like. However, the mobile object is not limited to these configurations.

In addition, the mobile object may be an electric vehicle which is configured so as to be capable of traveling by electromotive drive. In each Embodiment, a case in which the mobile object is the electric vehicle, will be described. Specifically, the electric vehicle according to each Embodiment is an electric cart, and in particular, is a single-seater electric cart. However, the electric vehicle is not limited to this, and it may be a vehicle other than the electric cart. For example, the electric vehicle can be an electric wheelchair, and in particular, can be a single-seater electric wheelchair. Hereinafter, the electric vehicle is simply called a "vehicle", if necessary.

Note that in regard to the drawings used for the description of each Embodiment, in FIGS. 1, 2, and 4 to 17, a vehicle front and a vehicle rear are indicated by an arrow F and an arrow R respectively. In other words, a vehicle front-rear direction is indicated by the arrow F and the arrow R. In FIGS. 1, 3, 4, 8 to 10, 14, and 15, a vehicle width direction is indicated by an arrow W. In FIGS. 1 to 17, a vehicle upper and a vehicle lower are indicated by an arrow U and an arrow L respectively. In other words, a vehicle upper-lower direction is indicated by the arrow U and the arrow L.

First Embodiment

With reference to FIGS. 1 to 8, an electric vehicle according to a First Embodiment will be described.

Outline of Electric Vehicle

Figure 1:
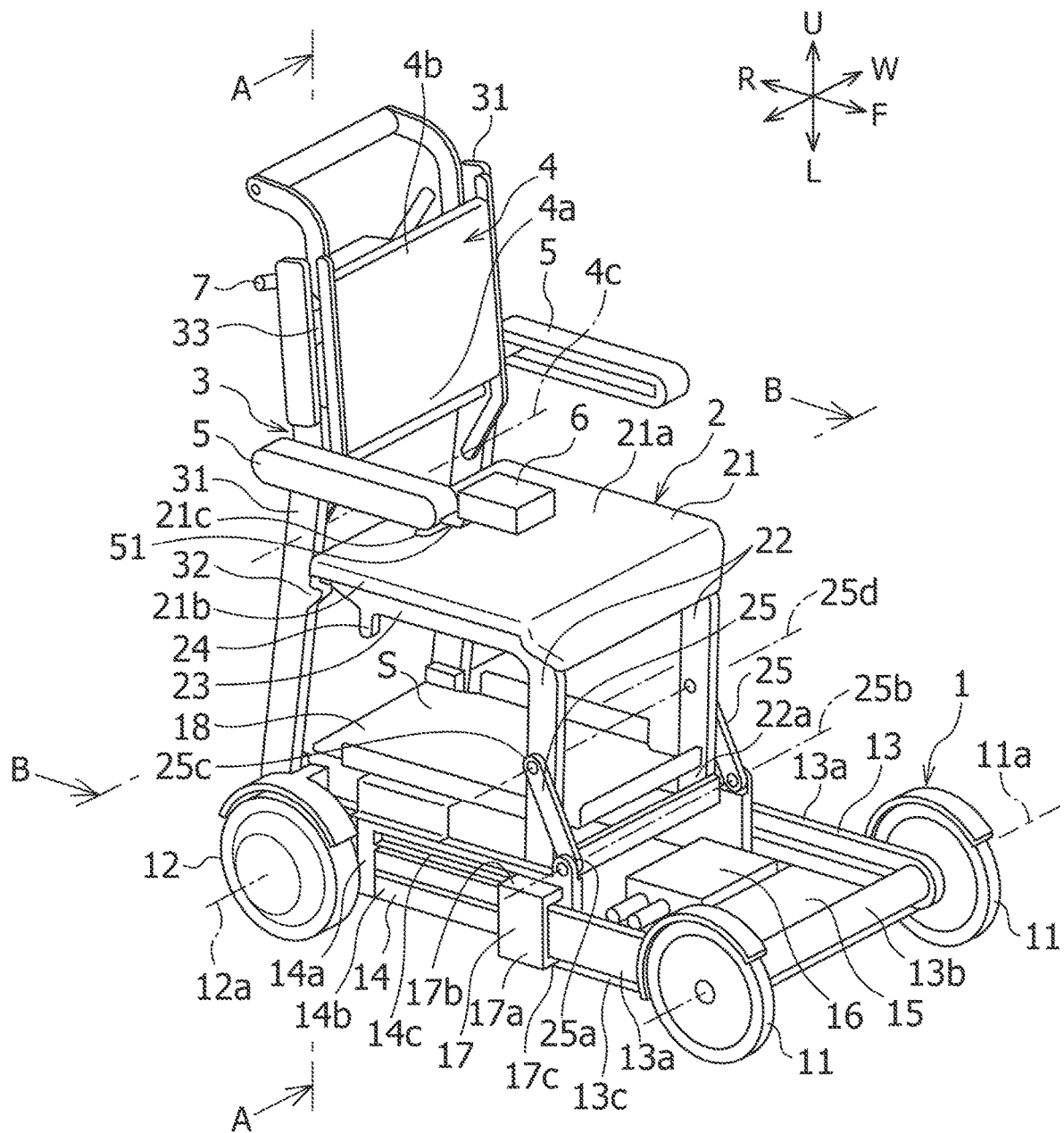
FIG. 1 is a front perspective view schematically showing an electric vehicle according to First and Second Embodiments, in an unfolded state.
Figure 2:
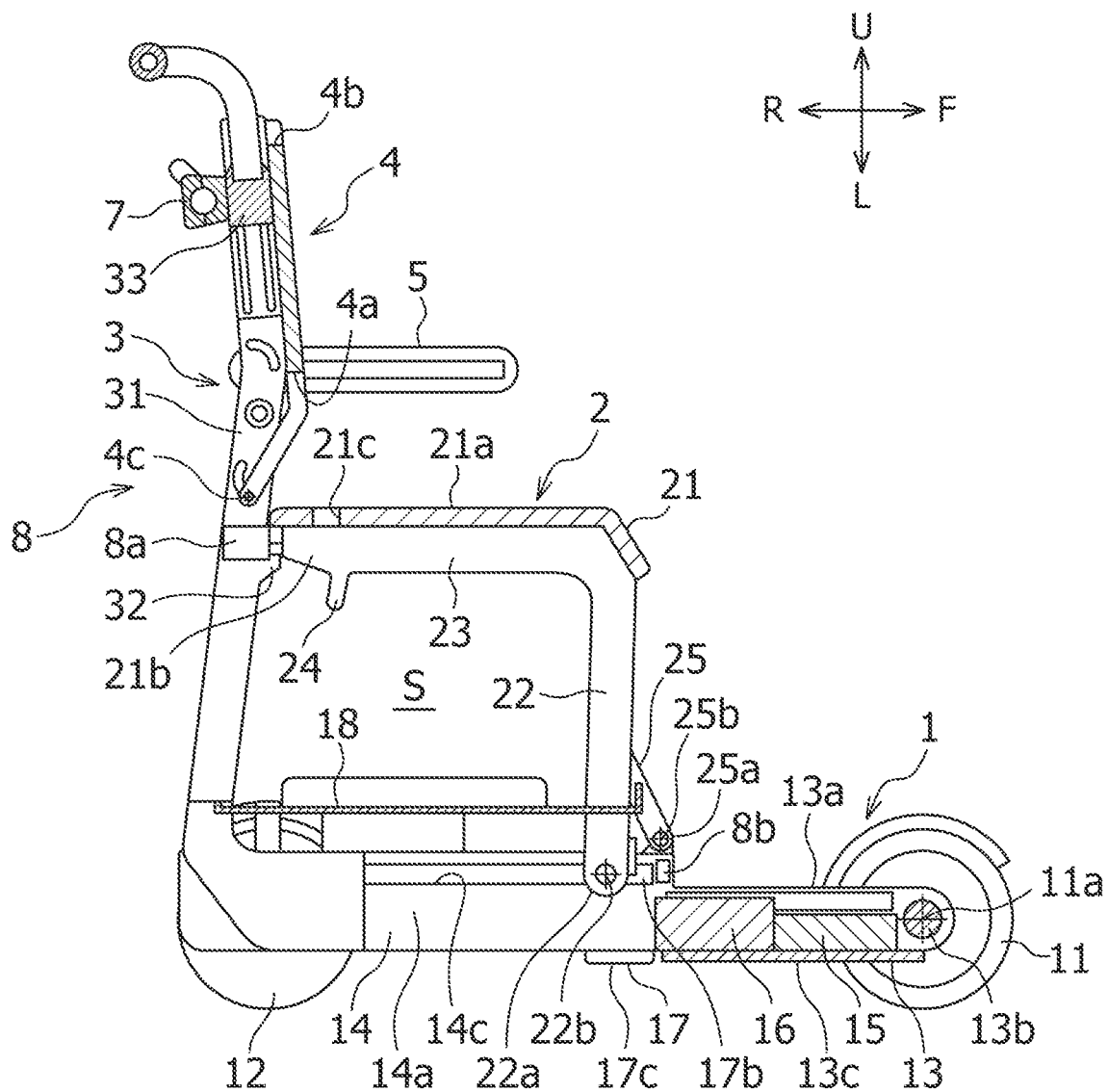
FIG. 2 is a cross-sectional view taken along line A-A in FIG. 1.

An outline of the electric vehicle according to the present Embodiment will be described. As shown in FIGS. 1 to 4, the vehicle has a moving base 1 which is configured so as to be capable of traveling by electromotive drive. The vehicle has one seat 2 located on the moving base 1. In particular, the abovementioned seat 2 is for a single-seater. However, the seat of the vehicle is not limited to this. As shown in FIGS. 1, 2, and 4, the vehicle has a frame 3 which is located in the vehicle rear with respect to the seat 2 on the moving base 1.

The vehicle has a back plate 4 which is configured so as to be capable of being used as a backrest for a user riding on the vehicle. The back plate 4 is located above the moving base 1. The vehicle has two armrests 5 which are respectively located on both sides in a seat width direction with respect to the seat 2. Note that the seat width direction substantially corresponds to a vehicle width direction. The respective armrests 5 are also located above the moving base 1. However, the vehicle can have an armrest on at least one side in the seat width direction with respect to the seat.

As shown in FIGS. 1 and 4, the vehicle has a front operating device 6 and a rear operating device 7 which are configured so as to allow the vehicle to be operated. The rear operating device 7 is located in the vehicle rear with respect to the front operating device 6. The respective front and rear operating devices 6, 7 are configured so as to allow a user, an assistant, or the like to perform an operation for travel-driving the vehicle, an operation for steering the vehicle, an operation for adjusting a speed of the vehicle, an operation for braking the vehicle, and the like. Although they are not particularly clearly shown, each of the front and rear operating devices 6, 7 may have a joystick, a touch panel, a steering, and/or the like, which are configured so as to allow the vehicle to be operated. As shown in FIGS. 2 and 4, the vehicle has a detection device 8 which is configured so as to be operable to detect a position of the seat 2.

As shown in FIGS. 1 to 4, in the electric vehicle, the moving base 1 has: two front wheels 11; and two rear wheels 12 which are located in the vehicle rear so as to be spaced apart from the front wheels 11. The front wheels 11 and the rear wheels 12 serve as traveling wheels of the vehicle. However, the moving base may have at least one front wheel and two or more rear wheels, or may have two or more front wheels and at least one rear wheel.

As shown in FIGS. 1, 2, and 4, the moving base 1 also includes: a front base 13 having the abovementioned front wheels 11; and a rear base 14 having the above-mentioned rear wheels 12. The rear base 14 is located in the vehicle rear with respect to the front base 13. As shown in FIGS. 1 and 5 to 8, the moving base 1 is configured so as to be capable of changing a wheel base H between the front wheels 11 and the rear wheels 12 so as to be expanded and contracted. In other words, the front base 13 and the rear base 14 of the moving base 1 are configured so as to be movable relative to each other to allow the wheel base H to be expanded and contracted.

The moving base 1 can change between an expanded state in which the wheel base H is expanded, and a contracted state in which the wheel base H is contracted so as to be shorter than the wheel base H in the expanded state by relative movement of the front base 13 and the rear base 14. Furthermore, this moving base 1 is configured such that the rear wheels 12 are driven and the front wheels 11 are stopped to expand and contract the wheel base H. In other words, when the wheel base H is expanded, the rear wheels 12 are rotationally driven so as to move the rear base 14 to the vehicle rear, and the front wheels 11 are stopped so as to hold the front base 13 in a fixed position. In addition, when the wheel base H is contracted, the rear wheels 12 are rotationally driven so as to move the rear base 14 to the vehicle front, and the front wheels 11 are stopped so as to hold the front base 13 in a fixed position. However, the moving base may be configured such that the front wheels are driven and the rear wheels are stopped to expand and contract the wheel base.

As shown in FIGS. 1 to 4, the seat 2 includes: a seating part 21 having a seating surface 21a; and two leg parts 22 which are capable of supporting the seating part 21. The two leg parts 22 are located so as to be spaced apart from each other in the seat width direction. However, the seat can also be configured so as to have at least one leg part.

As shown in FIGS. 1 and 5 to 8, the seat 2 is attached to the moving base 1 so as to be capable of moving in accordance with the expansion and the contraction of the wheel base H. In this seat 2, the seating part 21 is configured so as to move forward by movement of the leg parts 22 in association with the relative movement of the front base 13 and the rear base 14 in the vehicle front-rear direction to contract the wheel base H. The seating part 21 is also configured so as to move backward by the movement of the leg parts 22 in association with the relative movement of the front base 13 and the rear base 14 in the vehicle front-rear direction to expand the wheel base H.

Furthermore, the seat 2 is configured so as to be movable between a seating position in which the seating part 21 is located such that the seating surface 21a faces upward of the vehicle, and a retracting position in which the seating part 21 is retracted forward of the vehicle from the seating position. The seating part 21 is located in the seating position when the moving base 1 is in the expanded state. In addition, the seating part 21 is located in the retracting position when the moving base 1 is in the contracted state.

Figure 3:
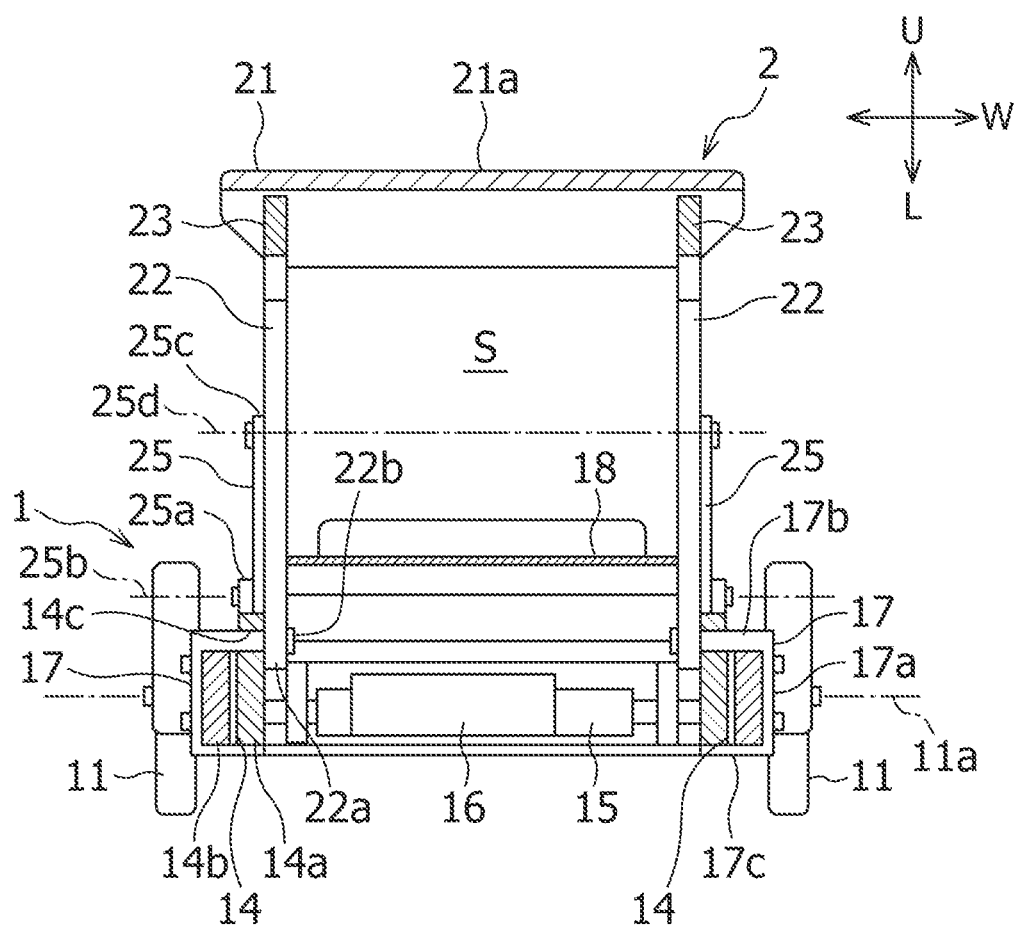
FIG. 3 is a cross-sectional view taken along line B-B in FIG. 1.
Figure 4:
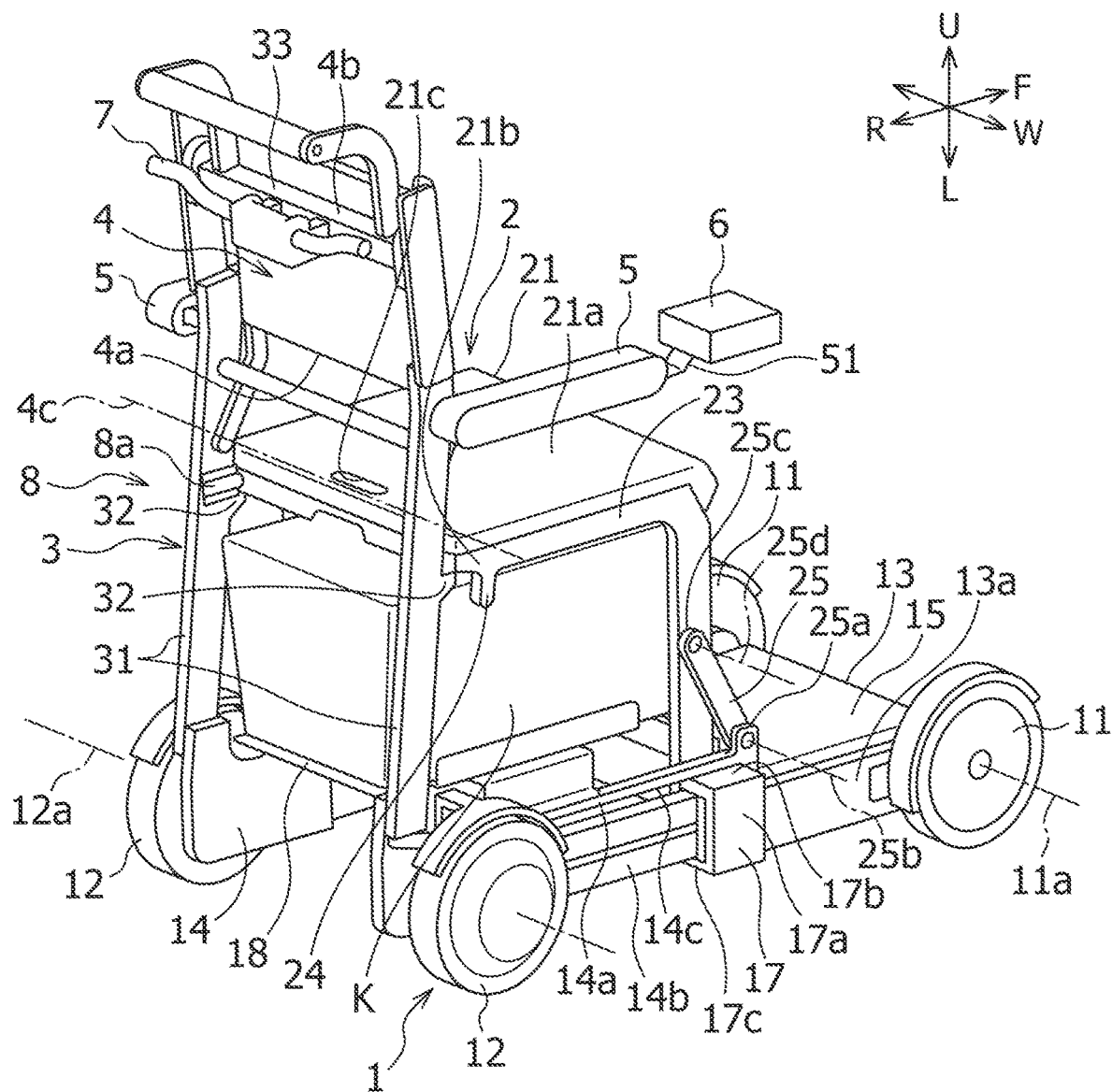
FIG. 4 is a rear perspective view schematically showing the electric vehicle on which a basket is placed, in the unfolded state in the First and Second Embodiments.

As shown in FIGS. 2 and 3, each leg part 22 has a base attaching section 22a configured as a component by which this leg part 22 is attached to the front base 13 so as to allow this leg part 22 to pivot with respect to the front base 13. As shown in FIGS. 1 and 5 to 8, movement of the seating part 21 toward a vehicle front side is provided by movement of the base attaching sections 22a of the leg parts 22 toward a vehicle rear side and pivoting of the leg parts 22 toward the vehicle front side in association with the relative movement of the front base 13 and the rear base 14 in the vehicle front-rear direction to contract the wheel base H. The seating part 21 can move from the seating position to the retracting position by the movement thereof toward the vehicle front side.

The movement of base attaching sections 22a of the leg parts 22 toward the vehicle front side, and the pivoting of the leg parts 22 toward the vehicle rear side, are provided by the relative movement of the front base 13 and the rear base 14 in the vehicle front-rear direction to expand the wheel base H, and thereby, the movement of the seating part 21 toward the vehicle rear side occurs. The seating part 21 can move from the retracting position to the seating position by the movement thereof toward the vehicle rear side.

As shown in FIGS. 1, 2, and 4, the frame 3 is located so as to be adjacent to the seating part 21 in the seating position in the vehicle rear. The frame 3 is also configured so as to support the seating part 21 in the seating position when the moving base 1 is in the expanded state.

Figure 7:
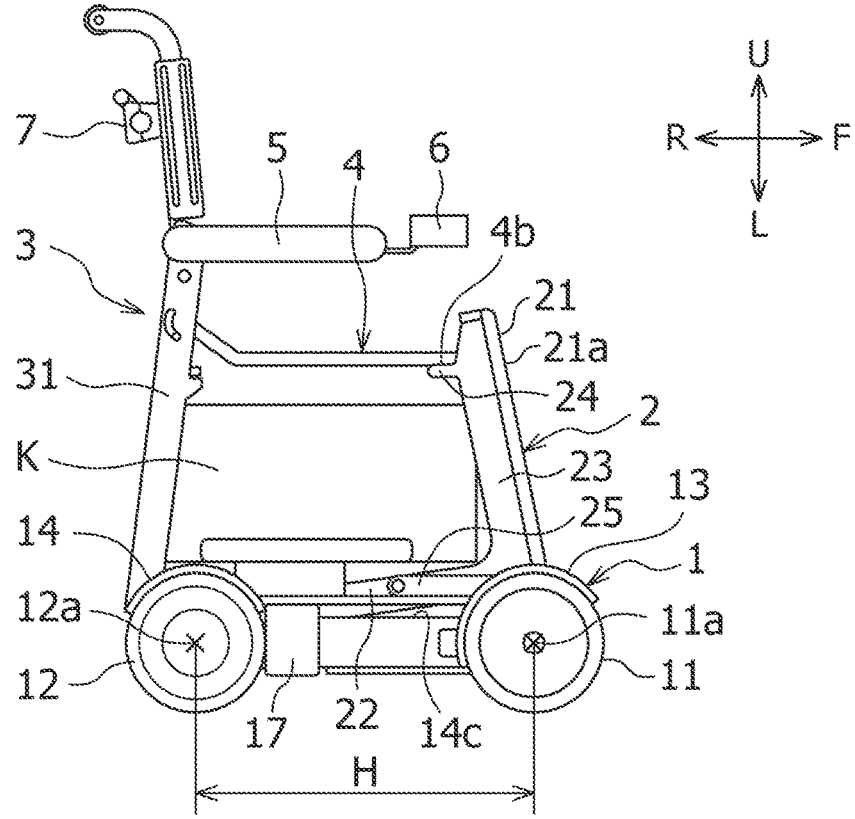
FIG. 7 is a left side view schematically showing the electric vehicle on which the basket is placed, in the folded state in the First and Second Embodiments.
Figure 8:
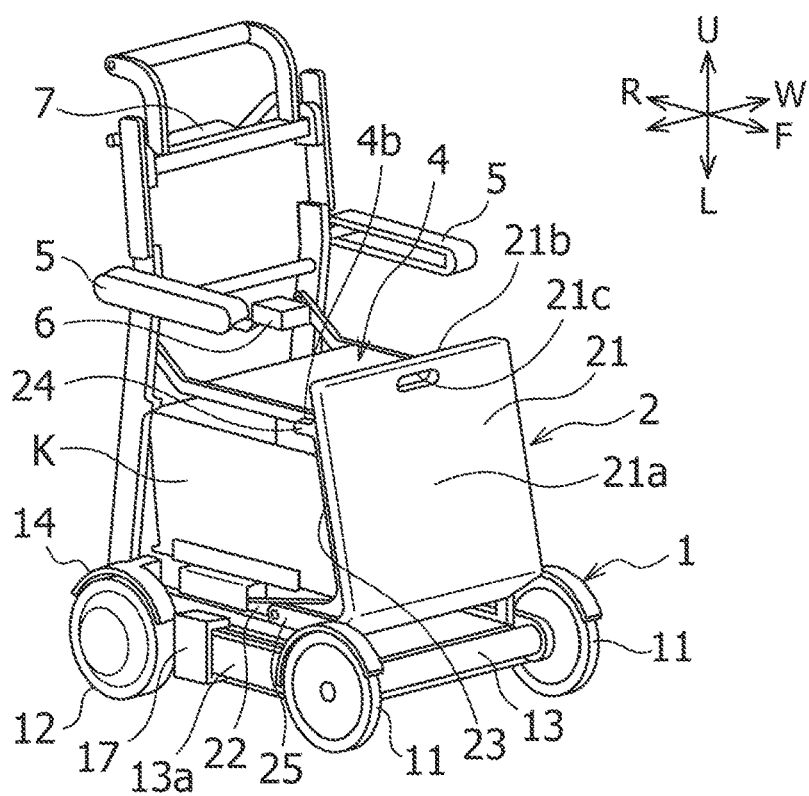
FIG. 8 is a front perspective view schematically showing the electric vehicle on which the basket is placed, in the folded state in the First and Second Embodiments.

The back plate 4 is configured so as to be movable between: a standing-up position in which the back plate 4 is located in the vehicle rear and in the vehicle upper with respect to the seating part 21 in the seating position; and a lying-down position in which the back plate 4 is located in the vehicle front with respect to the standing-up position. As shown in FIGS. 7 and 8, the seating part 21 in the retracting position is configured so as to support the back plate 4 in the lying-down position. Furthermore, as shown in FIG. 2, the back plate 4 is attached to the frame 3 so as to be pivotable between the standing-up position and the lying-down position.

The front operating device 6 is supported by one of the two armrests 5. However, the front operating device may be supported by both of the two armrests. The rear operating device 7 is located in the vehicle rear with respect to the back plate 4 in the standing-up position. The front operating device 6 can operate the vehicle in a state in which the seating part 21 and the back plate 4 are in the seating position and the standing-up position respectively. The rear operating device 7 can operate the vehicle in a state in which the seating part 21 and the back plate 4 are in the retracting position and the lying-down position respectively.

As shown in FIGS. 1 and 5 to 8, the vehicle is configured so as to start changing to contract the wheel base H, which was performed by the moving base 1, when the detection device 8 detects that the seat 2 in the seating position has moved. The vehicle is configured so as to start changing to expand the wheel base H, which was performed by the moving base 1, when the detection device 8 detects that the seat in the retracting position has moved.

As shown in FIGS. 1, 2, and 4 to 8, this detection device 8 has: a first sensor 8a which is located so as to be associated with the seat 2 in the seating position; and a second sensor 8b which is located so as to be associated with the seat 2 in the retracting position. However, when the seat can move in accordance with the expansion and the contraction of the wheel base, the first sensor may be disposed so as to be operable to detect that the moving base in the expanded state has started changing to contract the wheel base. In addition, the second sensor may be disposed so as to detect that the moving base in the contracted state has started changing to expand the wheel base. Furthermore, the detection device may have one sensor which is configured so as to be operable to detect both of starting of the movement of the seat in the seating position and starting of the movement of the seat in the retracting position.

As shown in FIGS. 1 and 5 to 8, the vehicle is set in un unfolded state when the moving base 1 is in the expanded state and the seat 2 is in the seating position. The vehicle in the unfolded state can travel by operating the front operating device 6 with a user riding thereon. The vehicle in the unfolded state can travel by operating the rear operating device 7 with a user, an assistant, or the like positioned in the vehicle rear. The vehicle in the unfolded state can travel also by manually pushing the vehicle with the user, the assistant, or the like positioned in the vehicle rear. This vehicle in the unfolded state can be used as a wheelchair, a cart, or the like.

In addition, the vehicle is set in a folded state when the moving base 1 is in the contracted state and the seat is in the retracting position. The vehicle in the folded state can travel by operating the rear operating device 7 with the user positioned in the vehicle rear.

In addition, the vehicle in the folded state can also travel by manually pushing the vehicle with the user positioned in the vehicle rear. This vehicle in the folded state can be used as a walking assisting vehicle, a shopping cart, a wheeled platform, or the like.

Details of Moving Base

Figure 5:
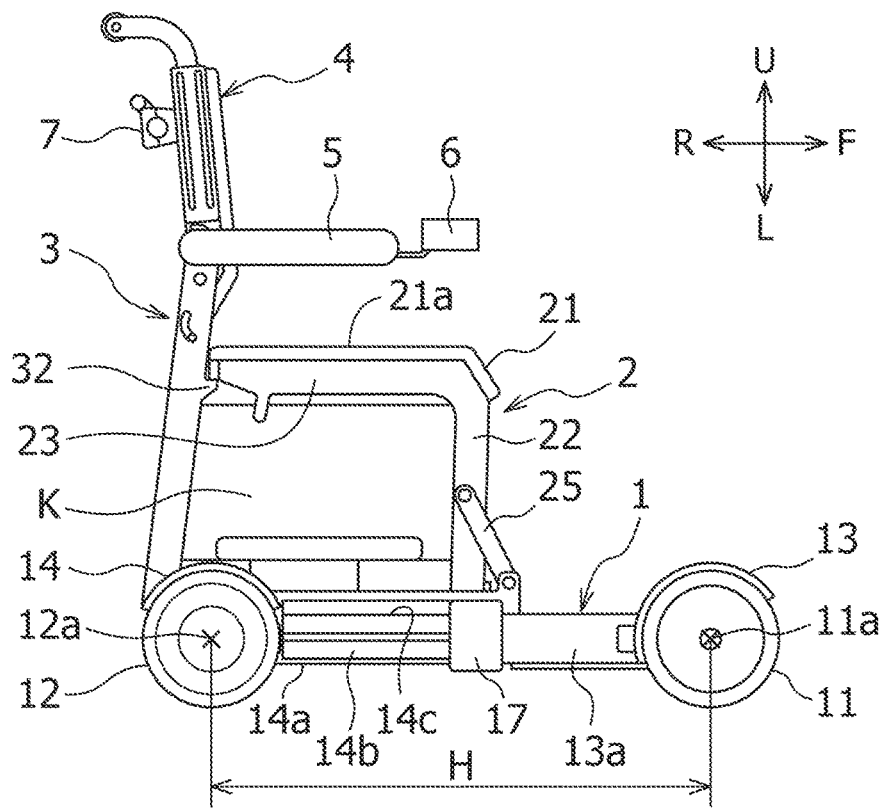
FIG. 5 is a left side view schematically showing the electric vehicle on which the basket is placed, in the unfolded state in the First and Second Embodiments.
Figure 6:
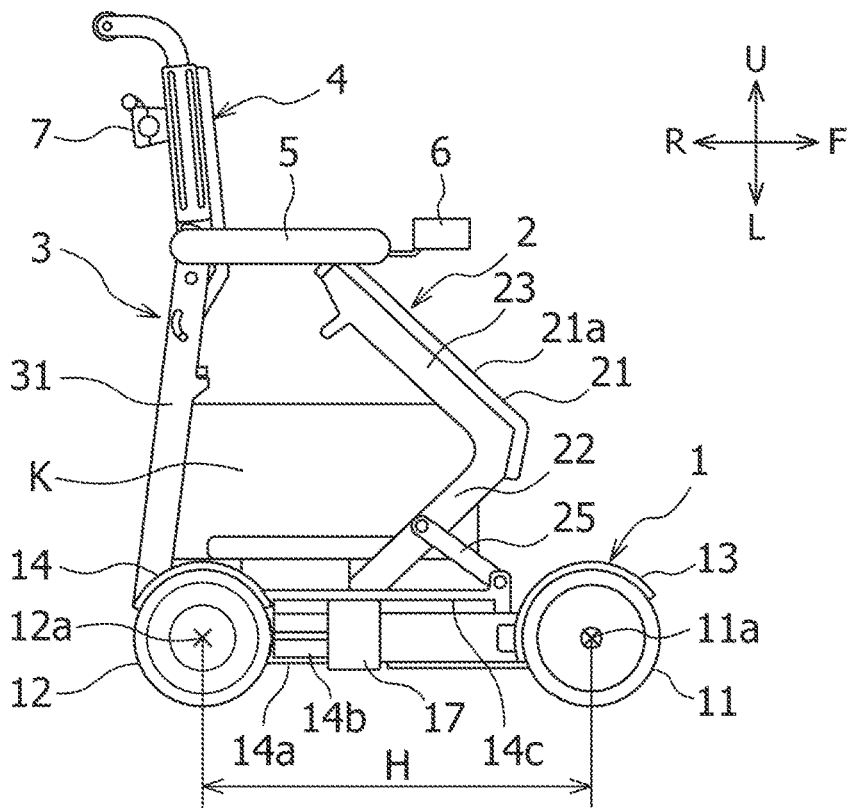
FIG. 6 is a left side view schematically showing the electric vehicle on which the basket is placed, in the middle state shifting between the unfolded state and the folded state in the First and Second Embodiments.

The moving base 1 may be configured as described below in detail. As shown in FIGS. 5 to 7, the front base 13 and the rear base 14 of the moving base 1 are substantially linearly slidable in the vehicle front-rear direction relative to each other. In particular, a difference in lengths of the wheel base H between the expanded state and the contracted state of the moving base, may be equal to or greater than a half of a maximum length of the seat 2 in a seat front-rear direction and is equal to or less than the maximum length thereof. In this case, the vehicle in the unfolded state when the moving base 1 is in the expanded state, can stably travel while stably supporting a user riding thereon, and the vehicle in the folded state when the moving base is in the contracted state, becomes compact and is operable with a small turn.

As shown in FIGS. 1 and 3, the front base 13 of the moving base 1 has two anterior side members 13a which are located so as to be spaced apart from each other in the vehicle width direction. The two front wheels 11 are respectively attached to front end portions of the two anterior side members 13a in the vehicle front-rear direction so as to be rotatable with a rotational shaft line 11a extending in the vehicle width direction as a center.

Although it is not particularly clearly shown, a braking device which is configured so as to be operable to brake the two front wheels 11, is mounted on the front base 13. For example, the braking device can have a solenoid lock mechanism which is adjacent to each front wheel 11 in the vehicle width direction. The solenoid lock mechanism has a mover which is operable to linearly advance and retreat. The mover may be configured so as to be movable between an advance position in which the mover is locked at the front wheels 11, and a retreat position in which the mover is separated from the front wheels 11. However, the braking device is not limited to this.

As shown in FIGS. 1 to 3, the front base 13 also has a front cross member 13b which extends in the vehicle width direction so as to connect front end portions of the two anterior side members 13a. The front base 13 has a front plate 13c which extends in the vehicle width direction so as to connect lower surfaces of the two anterior side members 13a. On the front base 13, a battery 15 which is configured as a power supply source for the vehicle, and a control device 16 for electrically control the vehicle, are mounted. The battery 15 and the control device 16 are located between the two anterior side members 13a in the vehicle width direction and are located in the vehicle rear with respect to the front cross member 13b. The battery 15 and the control device 16 are placed on the front plate 13c.

As shown in FIGS. 1 and 3, the rear base 14 of the moving base 1 has two posterior side members 14a which are located so as to be spaced apart from each other in the vehicle width direction. The two rear wheels 12 are respectively attached to rear end portions of the two posterior side members 14a in the vehicle front-rear direction so as to be rotatable with a rotational shaft line 12a which extends in the vehicle width direction, as a center. Although it is not particularly clearly shown, the rear base 14 has a driving motor for rotationally driving the respective rear wheels 12. For example, the driving motor may be located so as to be adjacent to each rear wheel 12 in the vehicle width direction, or the driving motor may be incorporated in each rear wheel 12. However, the driving motor is not limited to this.

The battery 15, the control device 16, and the driving motor are electrically connected to one another. In addition, the control device 16 is electrically connected to the detection device 8, and in particular, is electrically connected to the first and second sensors 8a and 8b of the detection device 8.

As shown in FIGS. 1 and 4, each posterior side member 14a has a guide part 14b which is formed so as to project from this posterior side member 14a toward the outside in the vehicle width direction. The guide part 14b substantially linearly extends in the vehicle front-rear direction. A front end, in the vehicle front-rear direction, of the guide part 14b is located so as to substantially correspond to a front end, in the vehicle front-rear direction, of each posterior side member 14a. A rear end, in the vehicle front-rear direction, of the guide part 14b is located in the vicinity of each rear wheel 12.

As shown in FIG. 2, in each posterior side member 14a, a guide long hole 14c is formed so as to penetrate through this posterior side member 14a in the vehicle width direction. The guide long hole 14c substantially linearly extends in the vehicle front-rear direction. The guide long hole 14c extends substantially in parallel with the guide part 14b.

As shown in FIGS. 1 to 4, the moving base 1 has base guides 17 which are configured so as to guide the front base 13 to move in the vehicle front-rear direction with respect to the rear base 14. Specifically, the moving base 1 has the two base guides 17, and these two base guides 17 are respectively attached to rear end portions, in the vehicle front-rear direction, of the two anterior side members 13a.

As shown in FIG. 3, each base guide 17 is formed in a substantially U-shape which is open toward the center of the vehicle width direction. Each base guide 17 has: a base part 17a which is located outside in the vehicle width direction; and upper and lower arm parts 17b and 17c which extend from this base part 17a toward the center of the vehicle width direction. The upper arm part 17b is located in a vehicle lower portion so as to be spaced apart from the lower arm part 17c.

In each base guide 17, the base part 17a is attached to a rear end portion of the anterior side member 13a. Furthermore, when the front base 13 moves in the vehicle front-rear direction with respect to the rear base 14, base guides 17 move along the guide parts 14b of the posterior side members 14a respectively. More specifically, the upper arm part 17b of each base guide 17 slides inside of the guide long hole 14c in the vehicle front-rear direction, and the lower arm part 17c slides along a lower side of the guide part 14b in the vehicle front-rear direction.

As shown in FIG. 5, the base guide 17 is located in a front end portion, in the vehicle front-rear direction, of the posterior side member 14a when the moving base 1 is in the expanded state. As shown in FIG. 7, the base guides 17 are respectively located in the vicinity of the rear wheels 12 when the moving base 1 is in the contracted state. More specifically, the base guides 17 are respectively located in the vehicle front with respect to the rear wheels 12 so as to operable to most approach to the rear wheels 12 respectively while preventing contact with the rear wheels 12 respectively, in a situation in which the moving base 1 is in the contracted state.

As shown in FIGS. 1, 2, and 4, the rear base 14 has a shelf plate 18 which is configured so as to allow a basket K (shown in FIG. 4) to be placed on the vehicle. The shelf plate 18 bridges the two posterior side members 14a and is supported by the two posterior side members 14a. The shelf plate 18 is located above the two posterior side members 14a.

Details of Seat

The seat 2 may be configured as described below in detail. As shown in FIG. 5, the seat 2 in the seating position is located substantially so as to extend the seating surface 21a of the seating part 21 along a vehicle horizontal direction. In addition, the seating part 21 in the seating position is located so as to be spaced apart from the shelf plate 18 in the vehicle upper-lower direction immediately above the shelf plate 18. Between the shelf plate 18 and the seating part 21, a baggage housing space S which is capable of housing the basket K, is formed.

In addition, the seat 2 in the retracting position is located such that the seating surface 21a of the seating part 21 is faced so as to form a predetermined angle with respect to a plane spreading in the vehicle upper-lower direction and the vehicle width direction. This angle may be equal to or less than approximately 30 degrees as an absolute angle. However, the angle of the seating surface is not limited to this. In addition, the seating part 21 in the retracting position is located in the vehicle front with respect to the shelf plate 18 while maintaining the baggage housing space S.

As shown in FIGS. 6 and 7, a rear end, in the seat front-rear direction, of the seating part 21 is a free end. Note that a seat front-rear direction is a direction which is substantially orthogonal to a seat width direction and extends between a front surface and a rear surface of the seating part 21.

As shown in FIGS. 1 to 4, the seating part 21 has two seat side members 23 which are located so as to be spaced apart from each other in the seat width direction. The two seat side members 23 are located so as to respectively correspond to the two leg parts 22 in the seat width direction. In addition, the two seat side members 23 are located in the lower with respect to the seating surface 21a in a seat upper-lower direction. Note that the seat upper-lower direction is a direction which is substantially orthogonal to the seat front-rear direction and the seat width direction. Each seat side member 23 extends in the seat front-rear direction.

As shown in FIGS. 7 and 8, the seat 2 has back plate support mechanisms 24 which are configured so as to support the back plate 4 in a state in which this seat 2 and the back plate 4 are in the retracting position and the lying-down position respectively. The back plate support mechanisms 24 are formed so as to respectively project downward in the seat upper-lower direction from seat side members 23.

The seating part 21 has a screen section 21b which extends between the back plate support mechanisms 24 and rear ends, in the seat front-rear direction, of the seat side members 23. The screen section 21b projects upward of the vehicle from the back plate 4 in the state in which this seat 2 and the back plate 4 are in the retracting position and the lying-down position respectively, and this screen section 21b can function as a screen for a baggage placed on the back plate 4.

The seating part 21 has a handle hole 21c which penetrates through a rear end section, in the seat upper-lower direction, of the seat front-rear direction. The handle hole 21c is formed in an elongate shape which extends in the seat width direction. A user can grab the rear end section of the seating part 21 while a finger of the user is inserted into the handle hole 21c.

As shown in FIGS. 1 to 3, the two leg parts 22 extend from the seating part 21 downward in the seat upper-lower direction. More specifically, the two leg parts 22 respectively extend from the two seat side members 23 downward in the seat upper-lower direction. The base attaching sections 22a of the leg parts 22 are located in lower ends, in the seat upper-lower direction, of the leg parts 22 respectively.

As shown in FIG. 2, each base attaching section 22a has a pivot shaft 22b which extends in the vehicle width direction. The base attaching sections 22a are attached to the anterior side members 13a respectively by using the pivot shafts 22b so as to allow the leg parts 22 to pivot with respect to the anterior side members 13a with the pivot shaft 22b as a center, respectively. More specifically, the base attaching sections 22a may be attached to the base guides 17.

The pivot shaft 22b is attached to the lower arm part 17b of the base guides 17, which is inserted into the guide long hole 14c of the posterior side members 14a. When the front base 13 moves in the vehicle front-rear direction with respect to the rear base 14, the pivot shaft 22b moves inside the guide long hole 14c in the vehicle front-rear direction.

As shown in FIGS. 1 to 4, the seat 2 has link members 25 which are configured so as to cause the relative movement of the front base 13 and the rear base 14 in the vehicle front-rear direction and the movement of the seat 2 to be in conjunction with each other. Specifically, the seat 2 has the two link members 25.

The link members 25 have base side attaching parts 25a respectively, which are attached to the posterior side members 14a of the rear base 14 respectively. The base side attaching parts 25a are attached to the posterior side members 14a respectively so as to be capable of pivoting with a pivot shaft line 25b, which extends in the vehicle width direction with respect to the posterior side members 14a, as a center. The base side attaching parts 25a are located in the vehicle front with respect to the base attaching sections 22a of the leg parts 22 respectively. The base side attaching part 25a is attached to a front end portion, in the vehicle front-rear direction, of the posterior side member 14a.

In addition, the link members 25 have seat side attaching parts 25c respectively, which are attached to the leg parts 22 of the seat 2 respectively. The seat side attaching parts 25c are located so as to be spaced apart from the base side attaching parts 25a respectively. The seat side attaching parts 25c are attached to the leg parts 22 respectively so as to be capable of pivoting with a pivot shaft line 25d, which extends in the vehicle width direction with respect to the leg parts 22, as a center. More specifically, the seat side attaching part 25c is attached in the middle portion, in the seat upper-lower direction, of the leg part 22.

As shown in FIGS. 5 to 7, when the base attaching sections 22a of the leg parts 22 move to the vehicle rear side in association with the movement of the vehicle rear side of the front base 13 with respect to the rear base 14 for movement of the seating part 21 toward the vehicle front side, the link members 25 prompt the leg parts 22 to pivot to the vehicle front side. In addition, when the base attaching sections 22a of the leg parts 22 move to the vehicle front side in association with the movement of the vehicle front of the front base 13 with respect to the rear base 14 for movement of the seating part 21 toward the vehicle rear side, the link members 25 prompt the leg parts 22 to pivot to the vehicle rear side.

Details of Frame

The frame 3 may be configured as described below in detail. As shown in FIGS. 1, 2, and 4, the frame 3 is located so as to be adjacent to the seat 2 in the vehicle rear with respect to the seat 2. The frame 3 has two supporting posts 31 which are located so as to be spaced apart from each other in the vehicle width direction. The two supporting posts 31 are located so as to respectively correspond to the two posterior side members 14a of the rear base 14 in the vehicle width direction. In addition, the two supporting posts 31 are located so as to respectively correspond to the two seat side members 23 in the seating part 21 of the seat 2 in the vehicle width direction. Each supporting post 31 is located along the vehicle upper-lower direction. Lower end portions, in the vehicle upper-lower direction, of supporting posts 31 are respectively attached to the rear end portions, in the vehicle front-rear direction, of the posterior side members 14a.

The frame 3 has seat support mechanisms 32 which are configured so as to be capable of supporting a rear end of the seating part 21 of the seat 2 in the seating position. More specifically, the frame 3 has the two seat support mechanisms 32, which are located in the middle portions, in the vehicle upper-lower direction, of the two supporting posts 31 respectively. The two support mechanisms 32 respectively support rear ends, in the seat front-rear direction, of the two seat side members 23 of the seating part 21. Furthermore, the seat support mechanism 32 can be formed so as to project from the middle portion of the supporting post 31 toward the vehicle front. In this case, the seat support mechanisms 32 support the rear end of the seating part 21 from the vehicle lower toward the vehicle upper.

The frame 3 has a coupling member 33 which extends in the vehicle width direction so as to couple upper end portions, in the vehicle upper-lower direction, of the two supporting posts 31. When the back plate 4 is in the standing-up position, the coupling member 33 is located in the vehicle rear with respect to the back plate 4 so as to contact this back plate 4. The rear operating device 7 is attached onto the coupling member 33.

Details of Back Plate

The back plate 4 may be configured as described below in detail. As shown in FIG. 5, the back plate 4 in the standing-up position is located along a plane spreading in the vehicle width direction and the vehicle upper-lower direction. In addition, the back plate 4 in the lying-down position is located along the vehicle horizontal direction. The back plate 4 in the lying-down position is located so as to be spaced apart from the shelf plate 18 in the vehicle upper-lower direction immediately above the shelf plate 18. Between the back plate 4 and the shelf plate 18, the baggage housing space S which is capable of housing the basket K, is maintained.

As shown in FIGS. 1, 2, and 4, the back plate 4 is formed in a substantially flat-plate shape. The back plate 4 in the standing-up position has a base end part 4a and a leading end part 4b which are respectively located on a lower end side and an upper end side, in the vehicle upper-lower direction, thereof. The base end part 4a of the back plate 4 is attached to the two supporting posts 31 of the frame 3 so as to allow the back plate 4 to pivot with the pivot shaft line 3c, which extends in the vehicle width direction, as a center. More specifically, the base end part 4a of the back plate 4 is attached in the middle portion, in the vehicle upper-lower direction, of the two supporting posts 31. The base end part 4a of the back plate 4 is located in the vehicle upper with respect to the seat support mechanisms 32 of the supporting posts 31 of the frame 3.

The leading end part 4b of the back plate 4 is a free end. The leading end part 4b of the back plate 4 is capable of pivoting between the standing-up position and the lying-down position with a pivot shaft line 4c as a center. Furthermore, when the seat 2 is in the retracting position and the back plate 4 is in the lying-down position, the leading end part 4b of the back plate 4 is supported by the back plate support mechanisms 24 of the leg parts 22 of the seat 2.

Details of Armrest

The armrests 5 may be configured as described below in detail. As shown in FIGS. 1, 2, and 4, the armrests 5 are formed so as to extend in the vehicle front-rear direction. The armrests 5 are located in the vehicle upper so as to be spaced apart from the seating part 21 of the seat 2. The two armrests 5 are respectively attached to the two supporting posts 31 of the frame 3. More specifically, a rear end portion, in the vehicle front-rear direction, of the armrest 5 is attached to the middle portion, in the vehicle upper-lower direction, of the supporting post 31.

The rear end portion of the armrest 5 is located in the vehicle upper with respect to the seat support mechanism 32 of the supporting post 31 and base end part 4a of the back plate 4. One of the two armrests 5 has a front attaching part 51 for attaching the front operating device 6. The front attaching part 51 is attached to a front end portion, in the vehicle front-rear direction, of the one of the two armrests.

Details of Detection Device

The detection device 8 may be configured as described below in detail. As shown in FIG. 2, the first sensor 8a of the detection device 8 can be a position sensor 8a which is located at one of the seat support mechanisms 32 of the frame 3. This first sensor 8a may be configured so as to be capable of detecting a position of the rear end of the seating part 21 of the seat 2 in the seating position, and in particular, a position of a rear end of each seat side member 23 of the seating part 21.

However, the first sensor is not limited to this. For example, the first sensor can also be an angle sensor which is located in one of the base attaching sections of the leg parts. In addition, when the first sensor is disposed so as to capable of detecting that the moving base in the expanded state has started changing to contract the wheel base, for example, the first sensor can be located in a front end portion of the rear base in the vehicle front-rear direction so as to be capable of detecting a position of the base guide of the front base of the moving base in the expanded state. Furthermore, the first sensor can also be a contact-type switch.

The second sensor 8b of the detection device 8 can be a position sensor 8b which is located in a front end portion, in the vehicle front-rear direction, of the rear base 14 of the moving base 1. The second sensor 8b may be configured so as to be capable of detecting a position of each of the upper end portions in the leg parts 22 of the seat 2 in the retracting position.

However, the second sensor is not limited to this. For example, the second sensor can also be an angle sensor which is located in one of the base attaching sections of the leg parts. In addition, when the second sensor is disposed so as to capable of detecting that the moving base in the contracted state has started changing to expand the wheel base, for example, the second sensor can be located in the rear end portion, in the vehicle front-rear direction, of the rear base in the vehicle front with respect to the rear wheels so as to be capable of detecting a position of the base guide of the front base of the moving base in the contracted state. Furthermore, the second sensor can also be a contact-type switch.

Note that when the detection device has one sensor which is configured so as to be capable of detecting both of starting of the movement of the seat in the seating position and starting of the movement of the seat in the retracting position, this one sensor may be an angle sensor which is located in one of the base attaching sections of the leg parts.

Example of Deformation Operation of Vehicle

An example of a deformation operation of a vehicle according to the present Embodiment will be described.

First, an operation in which the vehicle is deformed from an unfolded state to a folded state, will be described. In the unfolded state of the vehicle, a moving base 1 is in an expanded state, and a seat 2 is in a seating position. When a user manually starts movement of the seat 2 from the seating position to a retracting position, a detection device 8, and in particular, a first sensor 8*a* detects starting of the movement of the seat 2 from the seating position. The detection of the detection device 8 is transmitted to a control device 16.

To change the moving base 1 from the expanded state to a contracted state, the control device 16 moves a front base 13 and a rear base 14 relatively to each other in a vehicle front-rear direction so as to contract a wheel base H. Specifically, for example, to contract the wheel base H, the control device 16 controls a braking device so as to stop front wheels 11 and controls a driving motor so as to drive rear wheels 12. The relative movement of the front base 13 and the rear base 14 as mentioned above, is stopped when the moving base 1 is set in the contracted state.

Next, an operation in which the vehicle is deformed from the folded state to the unfolded state, will be described. In the folded state of the vehicle, the moving base 1 is in the contracted state, and the seat 2 is in the retracting position. When a user manually starts movement of the seat 2 from the retracting position to the seating position, the detection device 8, and in particular, a second sensor 8*b* detects starting of the movement of the seat 2 from the retracting position. The detection of the detection device 8 is transmitted to the control device 16.

To change the moving base 1 from the contracted state to the expanded state, the control device 16 moves the front base 13 and the rear base 14 relatively to each other in a vehicle front-rear direction so as to expand the wheel base H. Specifically, for example, to expand the wheel base H, the control device 16 controls the braking device so as to stop the front wheels 11 and controls the driving motor to drive the rear wheels 12. The relative movement of the front base 13 and the rear base 14 as mentioned above, is stopped when the moving base 1 is set in the expanded state.

As described above, the mobile object according to an aspect of the present Embodiment includes: the moving base 1 which includes the front base 13 having the front wheels 11, and the rear base 14 being located in the vehicle rear with respect to the front base 13 and having the rear wheels 12; and the seat 2 which includes the seating part 21 having the seating surface 21*a* and the leg parts 22 supporting the seating part 21 and is located on the moving base 1. The front base 13 and the rear base 14 can move forward and backward relative to each other to allow the wheel base H between the front wheels 11 and the rear wheels 12 to be expanded and contracted. The seating part 21 can move forward by the movement of the leg parts 22 in association with the relative forward and backward movement of the front base 13 and the rear base 14 to contract the wheel base H, and furthermore, the seating part 21 can move backward by the movement of the leg parts 22 in association with the relative forward and backward movement of the front base 13 and the rear base 14 to expand the wheel base H.

In the above-described mobile object, to allow the moving base 1 to change between: the expanded state in which the wheel base H is expanded to allow the mobile object to stably travel; and the contracted state in which the wheel base H is contracted to allow the mobile object to be operable with a small turn, the front base 13 and the rear base 14 can move forward and backward relative to each other. When this moving base 1 changes from the contracted state to the expanded state, the seating part 21 of the seat 2 can move backward from the retracting position in which the moving base 1 is in the contracted state, to the seating position in which the moving base 1 is in the expanded state by the movement of the leg parts 22 of the seat in association with the forward movement of the front base 13. Since in the expanded state of the moving base 1, the seating part 21 is stably maintained while the seating part 21 occupies a space inside the mobile object (hereinafter, referred to as a "seating space"), a user can be stably seated on the seating part 21. Thus, the unfolded state of the mobile object can be easily provided such that the seating part 21 of the seat 2 is in the seating position to allow a user to be stably seated thereon, and the moving base 1 is in the expanded state in which the mobile object can stably travel.

On the other hand, when the moving base 1 changes from the expanded state to the contracted state, the seating part 21 of the seat 2 can move forward from the seating position in which the moving base 1 is in the expanded state, to the retracting position in which the moving base 1 is in the contracted state by the movement of the leg parts 22 of the seat 2 in association with the backward movement of the front base 13. In the contracted state of the moving base 1, since the seating part 21 moves forward so as to retract from the seating space, baggage such as a shopping basket can be placed in the seating space on the moving base 1 in the contracted state. Thus, the folded state of the mobile object can be easily provided such that the seating part 21 is in the retracting position to ensure a space in which the baggage can be placed, and the moving base 1 is in the contracted state to allow the mobile object to be operable with a small turn. In addition, the unfolded state and the folded state of the mobile object can be easily switched. Hence, the mobile object in the folded state can be efficiently used as a walking assisting vehicle, a shopping cart, a wheeled platform, or the like, thus allowing user-friendliness of the mobile object to be enhanced.

In the mobile object according to the aspect of the present Embodiment, the leg parts 22 of the seat 2 respectively have the base attaching sections 22*a* attached to the front base 13 so as to allow the leg parts 22 to pivot with respect to the front base 13, the forward movement of the seating part 21 of the seat 2 is provided by the backward movement of the base attaching sections 22*a* of the leg parts 22 and forward pivoting of the leg parts 22 in association with the relative forward and backward movement of the front base 13 and the rear base 14 to contract the wheel base H, and the backward movement of the seating part 21 is provided by the forward movement of the base attaching sections 22*a* of the leg parts 22 and backward pivoting of the leg parts 22 in association with the relative forward and backward movement of the front base 13 and the rear base 14 to expand the wheel base H.

Therefore, since changing between the seating position and the retracting position of the seat 2, and changing of the moving base 1 between the expanded state and the contracted state, can be performed in conjunction with each other, the unfolded state of the mobile object in which the seat 2 is in the seating position and the moving base 1 is in the expanded state, and the folded state of the mobile object in which the seat 2 is in the retracting position and the moving base 1 is in the contracted state, can be easily switched by manually operating the seat 2. Thus, the user-friendliness of the mobile object can be enhanced.

In the mobile object according to the aspect of the present Embodiment, the moving base 1 can change between: the expanded state in which the wheel base H is expanded; and the contracted state in which the wheel base H is contracted so as to be shorter than the wheel base H in the expanded state by the relative forward and backward movement of the front base 13 and the rear base 14. Therefore, in the expanded state of the moving base 1, the mobile object can stably travel, and in the contracted state of the moving base 1, the mobile object can be operable with a small turn. Thus, the user-friendliness of the mobile object can be enhanced.

In the mobile object according to the aspect of the present Embodiment, the seating part 21 of the seat 2 is configured so as to cause the seating surface 21a to face forward when the moving base 1 is in the contracted state. Therefore, when the mobile object is in the folded state, the seating part 21 can be efficiently located so as to avoid the seating space while erecting the seating surface 21a so as to face forward. Furthermore, since the seating part 21 is located ahead of the seating space, the seating part 21 can be used as a screen for the baggage placed in the seating space. Thus, the mobile object even in the folded state can be efficiently used, and the user-friendliness of the mobile object can be enhanced.

The mobile object according to the aspect of the present Embodiment includes the frame 3 which is located behind the seat 2 on the rear base 14, the seating part 21 of the seat 2 causes the seating surface 21a to face upward when the moving base 1 is in the expanded state, and the frame 3 supports the seating part 21 when the moving base 1 is in the expanded state. Therefore, since when the mobile object is in the unfolded state, the seating part 21 of the seat 2 can be stably supported by the frame 3, also upon traveling of the mobile object, the seating part 21 can stably support a user, and as a result, the mobile object also in the unfolded state can be stably used. Thus, the user-friendliness of the mobile object can be enhanced.

An electric vehicle according to another aspect of the present Embodiment includes: a moving base 1 which is configured so as to be capable of traveling by electromotive drive; a seat 2 which include a seating part 21 having a seating surface 21a and is located on the moving base 1; and a back plate 4 which is configured so as to be capable of being used as a backrest associated with the seating part 21 and is located above the moving base 1. The seating part 21 is movable between a seating position in which the seating surface 21a is located so as to face upward, and a retracting position in which the seating part 21 is retracted forward from the seating position. The back plate 4 is movable between a standing-up position in which the back plate 4 is located behind and above the seating part 21 in the seating position, and a lying-down position in which the back plate 4 is located ahead of the standing-up position. The seating part 21 in the retracting position supports the back plate 4 in the lying-down position.

Therefore, when the seating part 21 of the seat 2 is in the seating position, since a seating space inside the electric vehicle can be stably maintained in a condition in which this occupies the seating space, a user can be stably seated on the seating part 21. Furthermore, when the back plate 4 is in the standing-up position, since the back plate 4 is located in the standing-up position in which back plate 4 is located behind and above the seating part 21 in the seating position, a user can stably lean against the back plate 4. When the seating part 21 is in the seating position, and the back plate 4 is in the standing-up position as mentioned above, an unfolded state of the electric vehicle in which a user can be seated on the seating part 21 of the seat 2, can be provided.

On the other hand, since the seating part 21 in the retracting position moves forward so as to retract from the seating space, and the seating part 21 in the retracting position supports the back plate 4 in the lying-down position, baggage, such as a shopping basket can be stably placed on this back plate 4 in the seating space of the electric vehicle. When the seating part 21 is in the retracting position, and the back plate 4 is in the lying-down position as described above, a folded state of the electric vehicle can be provided such that the electric vehicle can be used as a walking assisting vehicle, a shopping cart, a wheeled platform, or the like. Thus, the electric vehicle in the folded state can be efficiently used as the walking assisting vehicle, the shopping cart, the wheeled platform, or the like. In addition, user-friendliness of the electric vehicle can be enhanced, and in particular, operability of the electric vehicle can be enhanced so as to enhance the user-friendliness of the electric vehicle.

The electric vehicle according to the another aspect of the present Embodiment includes: an armrest 5 which is located on at least one side in a seat width direction with respect to the seating part 21 of the seat 2; and front and rear operating devices 6, 7 which are configured so as to be capable of operating the electric vehicle. The front operating device 6 is supported by the armrest 5, and the rear operating device 7 is located behind the back plate 4 in the standing-up position. When the seating part 21 and the back plate 4 are in the seating position and the standing-up position respectively, the electric vehicle can be operated by the front control device 6. When the seating part 21 and the back plate 4 are in the retracting position and the lying-down position respectively, the electric vehicle can be operated by the rear control device 7.

Therefore, when the electric vehicle is in the unfolded state, in a state in which a user is seated on the seating part 21 of the seat as described above and leans against the back plate 4 as described above, a user can operate the front operating device 6 located at the armrest 5. At this time, since the back plate 4 is located between a user and the rear operating device 7, it can be prevented by the back plate 4 that a user erroneously touches the rear operating device 7. Thus, the operability of the electric vehicle can be enhanced so as to enhance the user-friendliness of the electric vehicle.

The electric vehicle according to the another aspect of the present Embodiment includes a frame 3 which is located behind the seating part 21 in the seating position on the moving base 1, and the back plate 4 is attached to the frame 3 so as to be capable of pivoting between the standing-up position and the lying-down position. Therefore, since the back plate 4 can be changed between the standing-up position and the lying-down position by a simple process in which the back plate 4 is caused to pivot, the operability of the electric vehicle can be enhanced so as to enhance the user-friendliness of the electric vehicle.

An electric vehicle according to further another aspect of the present Embodiment is configured so as to be operable by electromotive drive, and includes: a moving base 1 having front wheels 11 and rear wheels 12; a seat 2 which includes a seating part 21 having a seating surface 21a; and a detection device 8 which is configured so as to be operable to detect a position of the seat 2. The moving base 1 can change so as to expand and contract a wheel base H between the front wheels 11 and the rear wheels 12. The seat 2 can move between a seating position in which seating part 21 is located so as to cause a seating surface 21a to face upward, and a retracting position in which the seating part 21 is retracted forward from the seating position. When the detection device 8 detects that the seat 2 in the seating position has moved, the moving base 1 starts changing to contract the wheel base H. When the detection device 8 detects that the seat 2 in the retracting position has moved, the moving base 1 starts changing to expand the wheel base H.

In the electric vehicle according thereto, the moving base 1 can change between the expanded state in which the wheel base H is expanded so as to set an unfolded state thereof in which the electric vehicle can stably travel, and the contracted state in which the wheel base H is contracted so as to set a folded state thereof in which the electric vehicle is operable with a small turn. In addition, when the movement of this seat 2 is manually started to change the seat 2 in the seating position to be set in the retracting position, the detection device 8 detects that the movement of the seat 2 has started, the moving base 1 is driven by this detection so as to contract the wheel base H, and the folded state of the electric vehicle can be automatically provided. Furthermore, when the movement of the seat 2 is manually started to change the seat 2 in the retracting position to be set in the seating position, the detection device 8 detects that the movement of the seat 2 has started, the moving base 1 is driven by this detection so as to expand the wheel base H, and the unfolded state of the electric vehicle can be automatically provided. Thus, the unfolded state and the folded state of the electric vehicle can be easily switched by manually operating the seat 2.

By locating the seating part 21 in the seating position so as to occupy a seating space inside the vehicle when the electric vehicle is in the unfolded state, the vehicle can stably travel, and in addition thereto, a user can be stably seated on the seating part 21. In addition, when the seating part 21 is located in the retracting position so as to be retracted from the seating space when the electric vehicle is in the folded state, the electric vehicle is made operable with a small turn, and in addition thereto, baggage, such as a shopping basket can be placed in the seating space. Thus, the electric vehicle in the folded state can be efficiently used as a walking assisting vehicle, a shopping cart, a wheeled platform, or the like, and user-friendliness of the electric vehicle can be enhanced.

In the electric vehicle according to the further another aspect of the present Embodiment, the seat 2 is in the seating position when the moving base 1 is in the expanded state in which the wheel base H is expanded, and the seat 2 is in the retracting position when the moving base 1 is in the contracted state in which the wheel base H is contracted so as to be shorter than the wheel base H in the expanded state of the moving base 1. In the electric vehicle according thereto, a detection device 8 has: a first sensor 8a which is located so as to be associated with the seat 2 in the seating position, or is operable to detect that the moving base 1 in the expanded state has started changing to contract the wheel base H; and a second sensor 8b which is located so as to be associated with the seat 2 in the retracting position, or is operable to detect that the moving base 1 in the contracted state has started changing to expand the wheel base H.

Therefore, when the first sensor 8a detects that the movement of the seat 2 in the seating position has started or detects that in conjunction therewith, the movement of the moving base 1 in the expanded state has started, the moving base 1 can be reliably driven by this detection so as to contract the wheel base H, and the folded state of the electric vehicle can be reliably provided. In addition, when the second sensor detects that the movement of the seat 2 in the retracting position has started or in conjunction therewith, the movement of the moving base 1 in the contracted state has started, the moving base 1 can be reliably driven by this detection so as to expand the wheel base H, and the unfolded state of the electric vehicle can be reliably provided. Thus, a user can easily switch the unfolded state and the folded state of the electric vehicle by manually operating the seat 2, and user-friendliness of the electric vehicle can be enhanced.

In the electric vehicle according to the further another aspect of the present Embodiment, one of the front wheels 11 and the rear wheels 12 are driven to expand and contract the wheel base H, and the other of the front wheels 11 and the rear wheels 12 are stopped. Therefore, without separately providing a driving mechanism for expanding and contracting the wheel base H, driving of the one of the front wheels 11 and the rear wheels 12 which are invariably provided for traveling and driving of the electric vehicle, and braking the other thereof are used, thereby allowing the wheel base H to be expanded and contracted. As a result, since a space which is required to provide the abovementioned driving mechanism in the electric vehicle, can be reduced, a space for baggage, such as a shopping basket, or the like can be increased. Thus, the user-friendliness of the electric vehicle can be enhanced.

Second Embodiment

An electric vehicle according to a Second Embodiment will be described. The electric vehicle according to the present Embodiment is configured so as to be the same as the electric vehicle according to the First Embodiment, except the below-described configuration. Therefore, components of the electric vehicle according to the present Embodiment, which are configured so as to be the same as the components of the electric vehicle according to the First Embodiment, are denoted by the same reference numerals and signs as those of the electric vehicle according to the First Embodiment.

With reference to FIGS. 1 to 8, in the electric vehicle according to the present Embodiment, a moving base 1 is configured so as to be operable to cause front wheels 11 and rear wheels 12 to be driven inversely to each other to expand and contract a wheel base H. In other words, when the wheel base H is expanded, the front wheels 11 are rotationally driven so as to move a front base 13 to the vehicle front, and the rear wheels 12 are rotationally driven so as to move a rear base 14 to the vehicle rear. In addition, when the wheel base H is contracted, the front wheels 11 are rotationally driven so as to move the front base 13 to the vehicle rear, and the rear wheels 12 are rotationally driven so as to move the rear base 14 to the vehicle front.

In the electric vehicle according thereto, although it is not particularly clearly shown, the front base 13 has a driving motor for rotationally driving the front wheels 11. For example, the driving motor may be located so as to be adjacent to each front wheel 11 in a vehicle width direction, or the driving motor may be incorporated into each front wheel 11. However, the driving motor is not limited to this. This driving motor for the front wheels 11 is electrically connected to a battery 15 and a control device 16.

As described above, by employing the electric vehicle according to the present Embodiment, effects the same as those of the electric vehicles according to the aspect and another aspect of the First Embodiment can be obtained. In addition, by employing the electric vehicle according to the present Embodiment, except effects based on the configuration in which one of the front wheels 11 and the rear wheels 12 is driven to expand and contract the wheel base H and the other thereof is stopped, effects the same as those of the electric vehicle according to the further another aspect of the First Embodiment can be obtained.

Furthermore, in the electric vehicle according to the present Embodiment, the front wheels 11 and the rear wheels 12 are driven inversely to each other to expand and contract the wheel base H. Therefore, without separately providing a driving mechanism for expanding and contracting the wheel base H, driving of the front wheels 11 and the rear wheels 12 which are invariably provided for traveling and driving of the electric vehicle, is used, thereby allowing the wheel base H to be expanded and contracted. As a result, since a space which is required to provide the abovementioned driving mechanism in the electric vehicle, can be reduced, a space for baggage, such as a shopping basket or the like can be increased. Thus, user-friendliness of the electric vehicle can be enhanced.

Third Embodiment

An electric vehicle according to a Third Embodiment will be described. The electric vehicle according to the present Embodiment is configured so as to be the same as the electric vehicle according to the First or Second Embodiment, except the below-described configuration. Therefore, components of the electric vehicle according to the present Embodiment, which are configured so as to be the same as the components of the electric vehicle according to the First or Second Embodiment, are denoted by the same reference numerals and signs as those of the electric vehicle according to the First or Second Embodiment.

Figure 9:
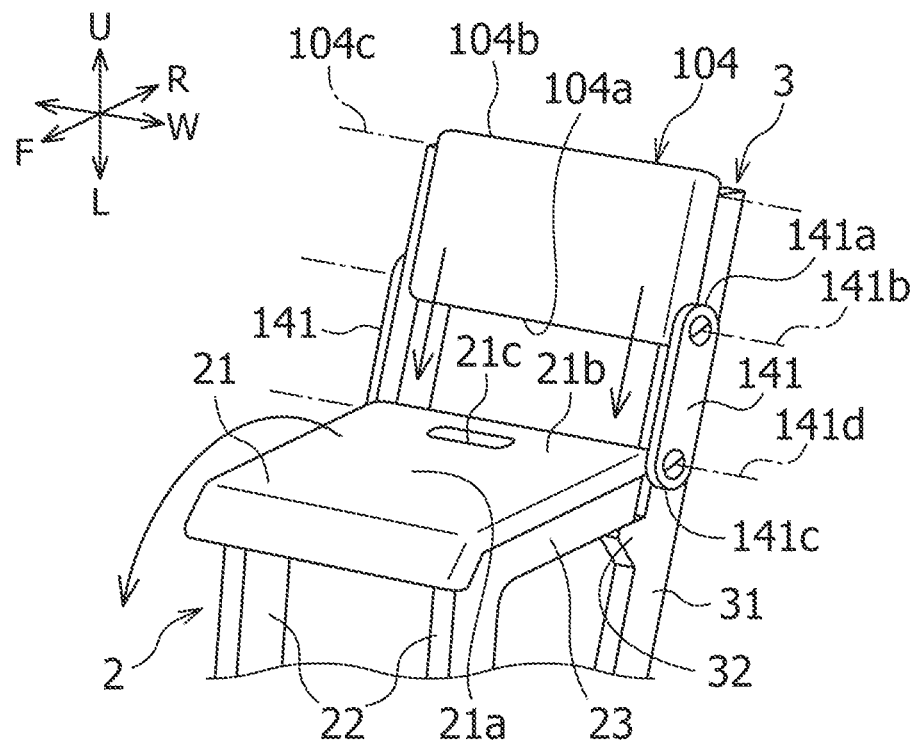
FIG. 9 is a front perspective view schematically showing a seat in a seating state and a back plate in a standing-up state in an electric vehicle according to a Third Embodiment.
Figure 10:
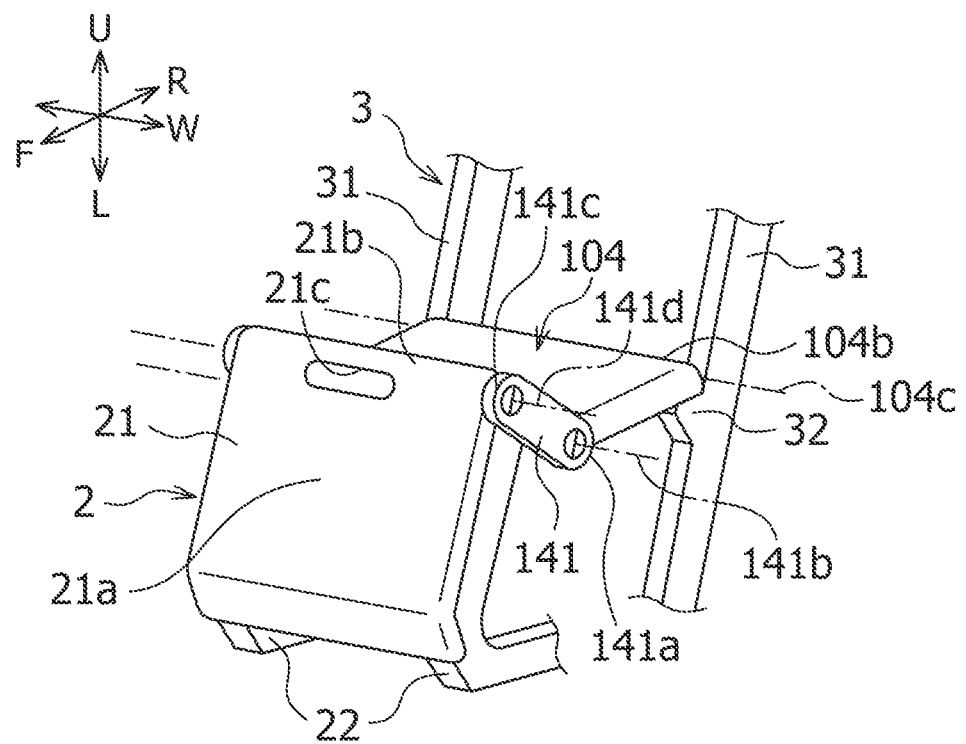
FIG. 10 is a front perspective view schematically showing the seat in a retracting state and the back plate in a lying-down state in the electric vehicle according to the Third Embodiment.

As shown in FIGS. 9 and 10, the electric vehicle according to the present Embodiment has a back plate 104 which is configured so as to be the same as the back plate 4 in the First or Second Embodiment, except that the back plate 104 can move between a standing-up position and a lying-down position along a frame 3. Furthermore, the back plate 104 may be configured as described below. The back plate 104 in the standing-up position has a base end part 104a and a leading end part 104b which are located on a lower end side and an upper end side in a vehicle upper-lower direction, respectively. The base end part 104a of the back plate 104 is coupled via coupling members 141 to a rear end section of a seating part 21 of a seat 2.

Specifically, the two coupling members 141 respectively have back plate side attaching parts 141a which are attached to both ends, in a seat width direction, of the base end part 104a of the back plate 104. The back plate side attaching parts 141a are attached to the base end part 104a of the back plate 104 so as to be capable of pivoting with a pivot shaft line 141b, which extends in the seat width direction with respect to the base end part 104a of the back plate 104, as a center.

In addition, the two coupling members 141 respectively have seat side attaching parts 141c which are attached to both ends, in the seat width direction, of a rear end portion of the seating part 21. The seat side attaching parts 141c are located so as to be spaced apart from the back plate side attaching parts 141a. The seat side attaching parts 141c are attached to the rear end section of the seating part 21 so as to capable of pivoting with a pivot shaft line 141d, which extends in the seat width direction with respect to the rear end section of the seating part 21, as a center.

The leading end part 104b of the back plate 104 is attached to the frame 3 so as to be capable of pivoting and slidably moving with respect to the frame 3. Specifically, both ends, in the seat width direction, of the leading end part 104b of the back plate 104 are capable of pivoting with respect to two supporting posts 31 of the frame 3, with a pivot shaft line 104c, which extends in the seat width direction, as a center, and are attached to the two supporting posts 31 so as to be capable of slidably move along the two supporting posts 31 together with the pivot shaft line 104c.

With the back plate 104 in the standing-up position, the base end part 104a of the back plate 104 is located in the vehicle upper with respect to seat support mechanisms 32 of the supporting posts 31 of the frame 3. Furthermore, when the seat 2 is in a retracting position, and the back plate 104 is in the lying-down position, the base end part 104a of the back plate 104 is supported via the coupling members 141 by the rear end section of the seating part 21 of the seat 2, and the leading end part 104b of the back plate 104 is supported by the seat support mechanisms 32 of the frame 3.

This back plate 104 moves between the standing-up position and the lying-down position in association with movement of the seat 2 between a seating position and the retracting position. When the back plate 104 moves from the standing-up position to the lying-down position, the back plate 104 pivots with the pivot shaft line 104c of the leading end part 104b as a center to a vehicle front side, and the leading end part 104b of the back plate 104 moves along the supporting posts 31 from the vehicle upper to the vehicle lower. Furthermore, when the seat 2 has reached the retracting position, and the leading end part 104b of the back plate 104 has reached the seat support mechanisms 32 of the frame 3, the back plate 104 is located along a vehicle horizontal direction. At this time, the back plate 104 reaches the lying-down position. When the back plate 104 moves from the lying-down position to the standing-up position, the above-described operations are reversely performed.

As described above, by employing the electric vehicle according to the present Embodiment, effects the same as those of the electric vehicles according to the aspect and the further another aspect of the First Embodiment can be obtained. In addition, by employing the electric vehicle according to the present Embodiment, except effects based on the configuration in which the back plate 4 is attached to the frame 3 so as to be capable of pivoting between the standing-up position and the lying-down position, effects the same as those attained by the electric vehicle according to the another aspect of the First Embodiment can be obtained.

Furthermore, the electric vehicle according to the present Embodiment further includes the frame 3 which is located behind the seating part 21 on the moving base 1 in the seating position, and the back plate 104 can move along the frame 3 between the standing-up position and the lying-down position. Therefore, since the back plate 104 can be changed between the standing-up position and the lying-down position by a simple process in which the back plate 104 is moved along the frame 3, operability of the electric vehicle can be enhanced to enhance user-friendliness of the electric vehicle.

Fourth Embodiment

An electric vehicle according to a Fourth Embodiment will be described. The electric vehicle according to the present Embodiment is configured so as to be the same as the electric vehicle according to any one of the First to Third Embodiments, except the below-described configuration. Therefore, components of the electric vehicle according to the present Embodiment, which are configured so as to be the same as the components of the electric vehicle according to any one of the First to Third Embodiments, are denoted by the same reference numerals and signs as those of the electric vehicle according to any one of the First to Third Embodiments.

Figure 11:
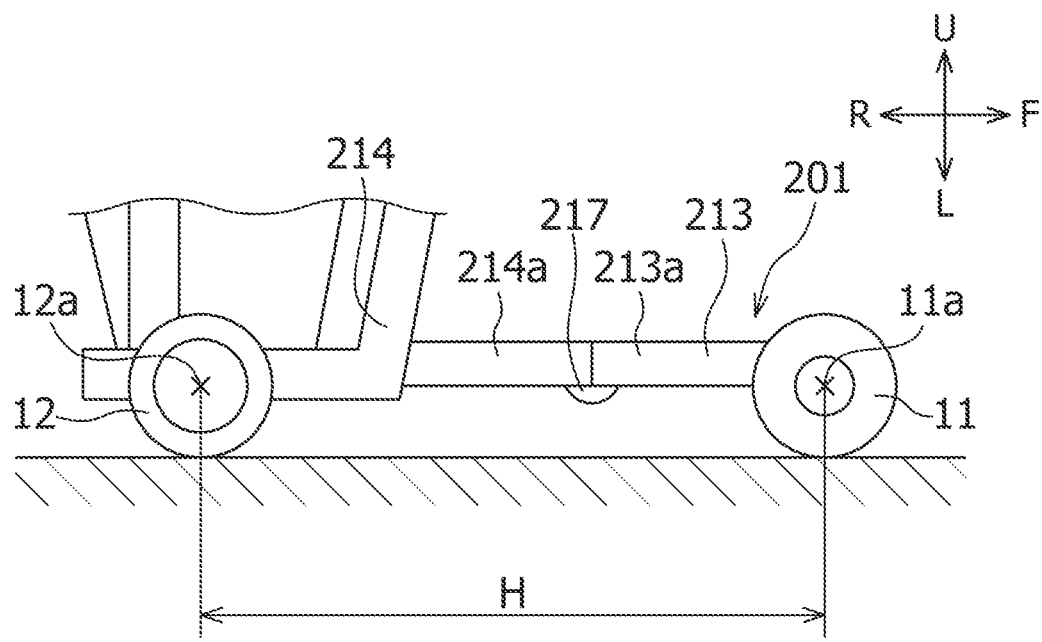
FIG. 11 is a left side view schematically showing a moving base in an expanded state in an electric vehicle according to a Fourth Embodiment.
Figure 12:
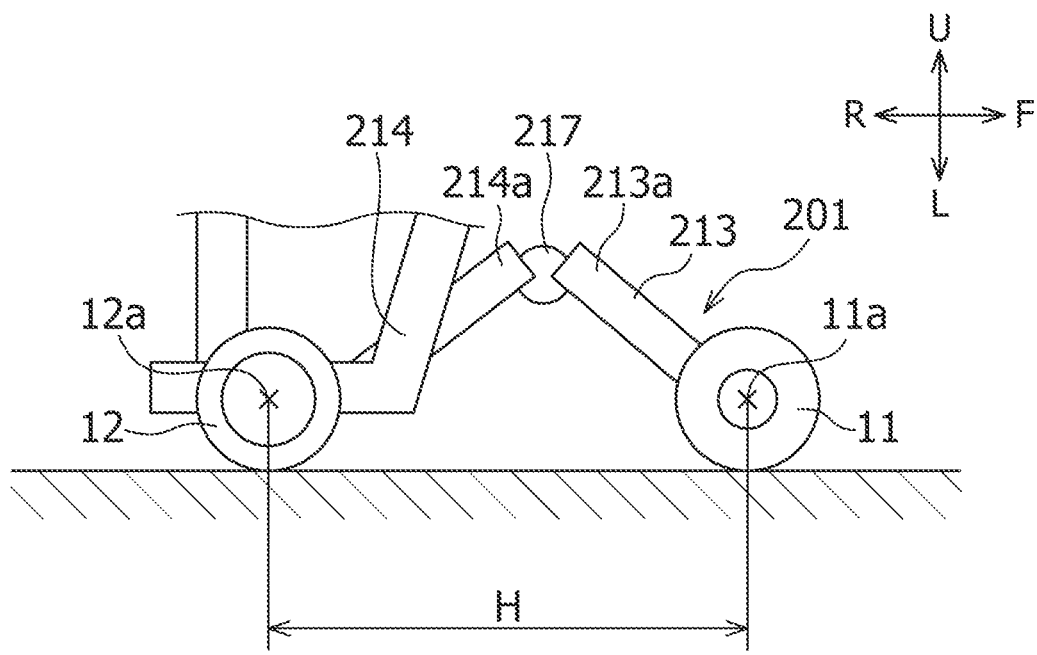
FIG. 12 is a left side view schematically showing the moving base in a contracted state in the electric vehicle according to the Fourth Embodiment.
Figure 13:
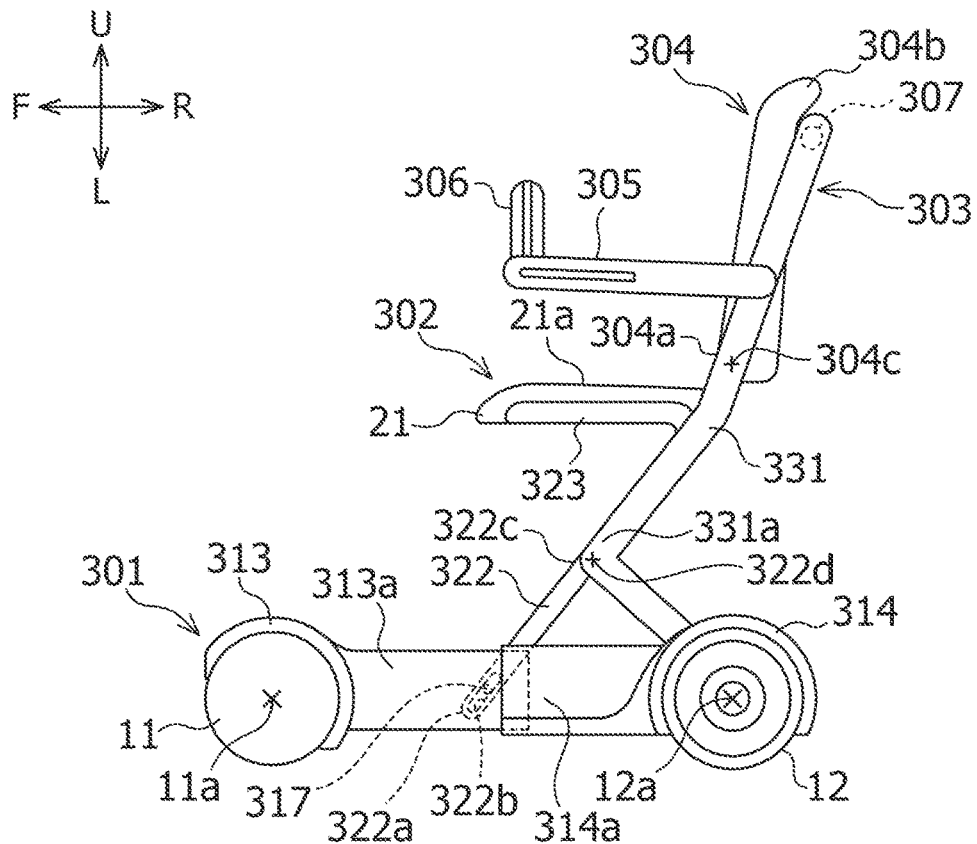
FIG. 13 is a right side view schematically showing an electric vehicle in an unfolded state according to a Fifth Embodiment.
Figure 14:
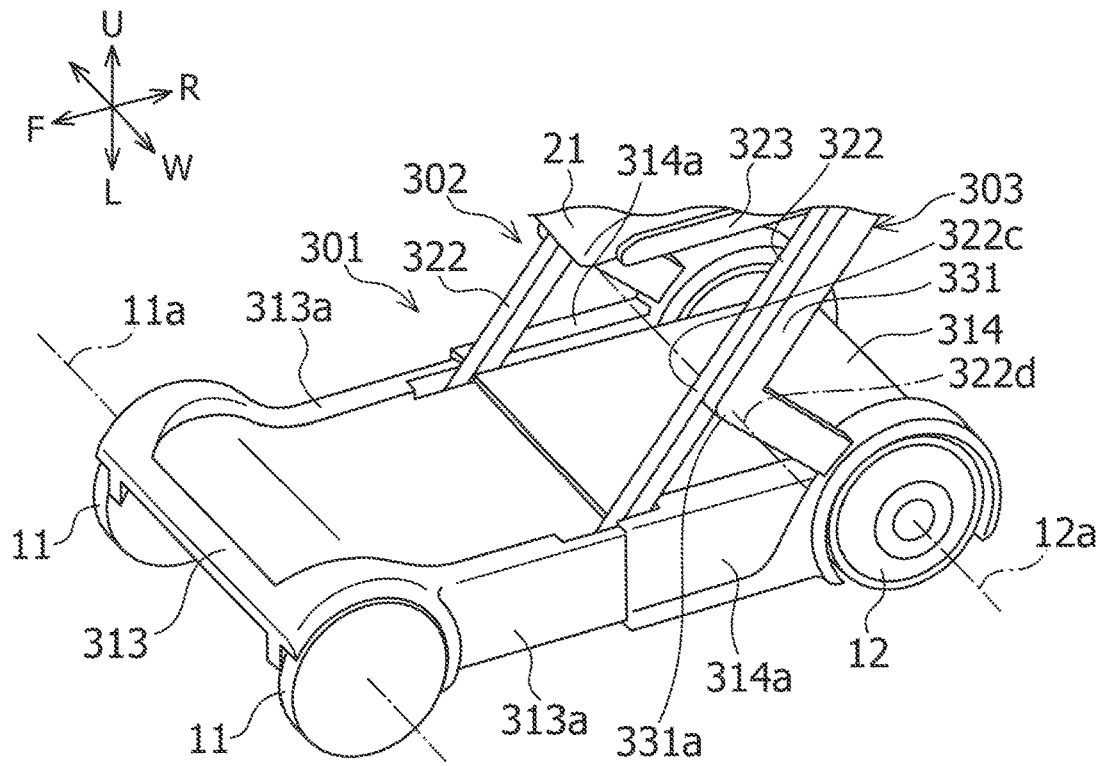
FIG. 14 is a front perspective view schematically showing a moving base and a peripheral portion thereof in the electric vehicle according to the Fifth Embodiment.
Figure 15:
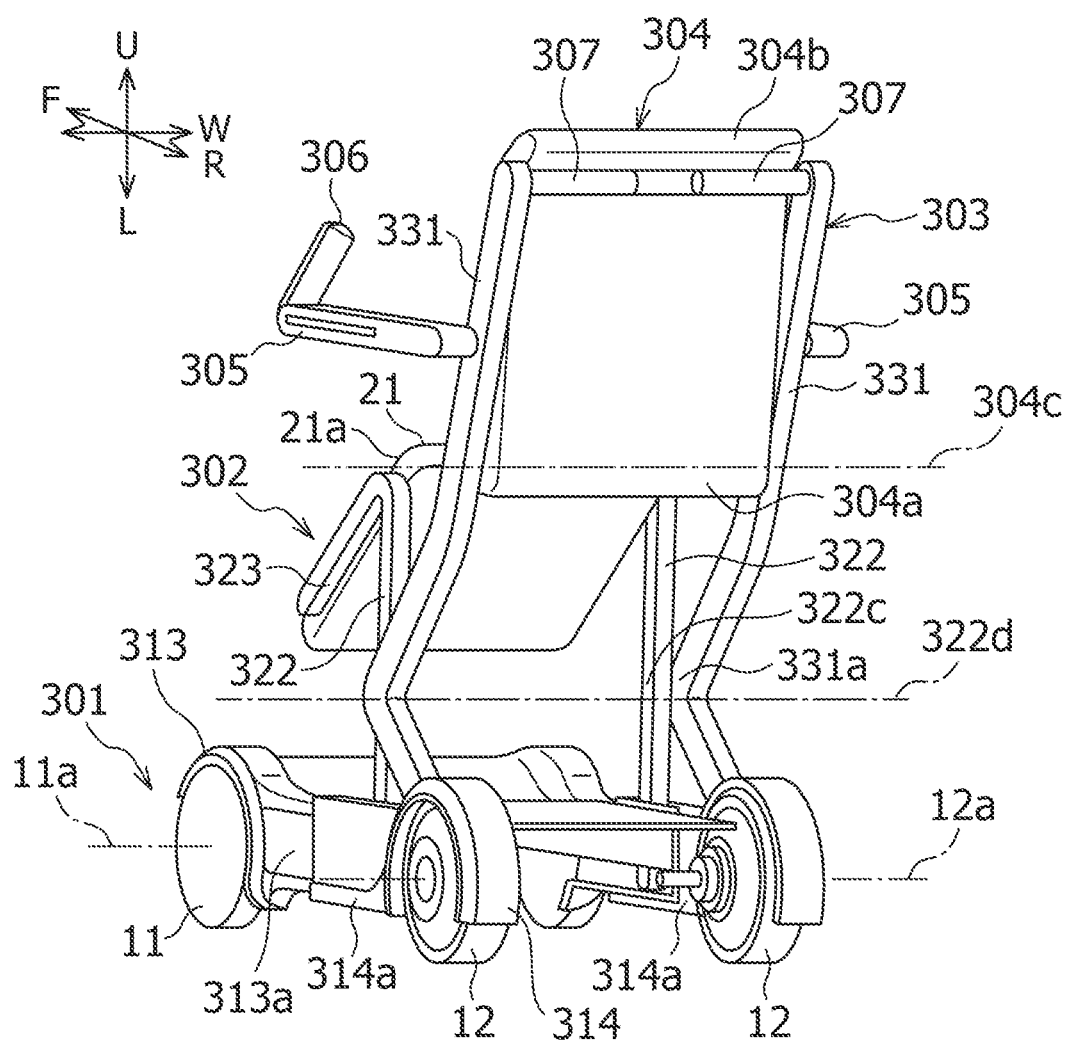
FIG. 15 is a rear perspective view schematically showing the electric vehicle according to the Fifth Embodiment, on which a basket is placed, in the middle state shifting between an unfolded state and a folded state.

As shown in FIGS. 11 and 12, the electric vehicle according to the present Embodiment has a moving base 201 which is configured so as to be the same as the moving base 1 in any one of the First to Third Embodiments, except the below-described point. The moving base 201 includes a front base 213 having front wheels 11 and a rear base 214 having rear wheels 12. The rear base 214 is located in the vehicle rear with respect to the front base 213.

The front base 213 and the rear base 214 are further configured so as to be respectively the same as the front base 13 and the rear base 14 of the moving base 1 in any one of the First to Third Embodiments. The front base 213 and the rear base 214 of the moving base 201 are coupled to each other so as to pivot with a pivot shaft line 201a, which extends in a vehicle width direction, as a center. More specifically, the front base 213 has two anterior side members 213a which are located so as to be spaced apart from each other in the vehicle width direction. The rear base 214 has two posterior side members 214a which are located so as to be spaced apart from each other in the vehicle width direction.

The anterior side member 213a and the posterior side member 214a are configured so as to be respectively the same as the anterior side member 13a and the posterior side member 14a in any one of the First to Third Embodiments, except the below-described point. Rear end portions, in a vehicle front-rear direction, of the two anterior side members 213a are attached to front end portions, in the vehicle front-rear direction, of the posterior side members 214a by a pivoting coupling mechanism 217 so as to be capable of pivoting with the pivot shaft line 201a as a center with respect to these front end portions. This moving base 201 has the pivoting coupling mechanism 217, instead of the base guides 17 of the moving base 1 in any one of the First to Third Embodiments.

When the moving base 201 changes from an expanded state to a contracted state, rear end portions, in the vehicle front-rear direction, of the front base 213 pivot with a rotational shaft line 11a of front wheels 11 as a center so as to be lifted upward of the vehicle. In addition, front end portions, in the vehicle front-rear direction, of the rear base 214 pivot with a rotational shaft line 12a of rear wheels 12 as a center so as to be lifted upward of the vehicle. As a result, the front base 213 and the rear base 214 are bent in a substantially inverted V-shape whose vertex is the pivoting coupling mechanism 217. When the moving base 201 changes from the contracted state to the expanded state, the above-described operations are reversely performed.

Fifth Embodiment

An electric vehicle according to a Fifth Embodiment will be described. The electric vehicle according to the present Embodiment is configured so as to be the same as the electric vehicle according to any one of the First to Third Embodiments, except the below-described configuration. Therefore, components of the electric vehicle according to the present Embodiment, which are configured so as to be the same as the components of the electric vehicle according to any one of the First to Third Embodiments, are denoted by the same reference numerals and signs as those of the electric vehicle according to any one of the First to Third Embodiments.

Note that in FIGS. 13 to 17 used for describing the electric vehicle according to the present Embodiment, a detection device and the like are omitted. However, the electric vehicle according to the present Embodiment can include the detection device and the like as mentioned above, and by employing the electric vehicle according to the present Embodiment, operation and effect based on the detection device and the like can also be obtained as with the First to Third Embodiments.

Moving Base

As shown in FIGS. 13 to 17, the electric vehicle according to the present Embodiment has a moving base 301 which is configured so as to be the same as the moving base 1 in any one of the First to Third Embodiments, except the below-described point. The moving base 301 is configured so as to be capable of changing so as to expand and contract a wheel base H between front wheels 11 and rear wheels 12 as the same as the moving base 1 in any one of the First to Third Embodiments.

The moving base 301 includes a front base 313 having the front wheels 11 and a rear base 314 having the rear wheels 12. The rear base 314 is located in the vehicle rear with respect to the front base 313. The front base 313 and the rear base 314 respectively correspond to the front base 13 and the rear base 14 in any one of the First to Third Embodiments. The front base 313 and the rear base 314 are configured so as to be capable of moving in a vehicle front-rear direction relative to each other to allow the wheel base H to be expanded and contracted as the same as the front base 13 and the rear base 14 in any one of the First to Third Embodiments.

The front base 313 has two anterior side members 313a which respectively correspond to the two anterior side members 13a in any one of the First to Third Embodiments. The rear base 314 has two posterior side members 314a which respectively correspond to the two posterior side members 14a in any one of the First to Third Embodiments.

The anterior side members 313a has a pivot shaft 317 which is formed so as to project in a vehicle width direction from rear end portions, in the vehicle front-rear direction, of the anterior side members 313a. Although details will be described later, leg parts 322 of a seat 302 are attached to the pivot shaft 317. The pivot shaft 317 is located so as to avoid interference with the rear base 314 when the front base 313 and the rear base 314 move relatively to each other.

Furthermore, the pivot shaft 317 may be located in front end portions, in the vehicle front-rear direction, of the posterior side members 314a when the moving base 301 is in an expanded state. In addition, the pivot shaft 317 may be located in the vicinity of the rear wheels 12 when the moving base 301 is in a contracted state.

Seat

As shown in FIGS. 13 to 17, the electric vehicle according to the present Embodiment has a seat 302 which is configured so as to be the same as the seat 2 in any one of the First to Third Embodiments, except the below-described point. The seat 302 includes two leg parts 322 which are capable of supporting a seating part 21. The two leg parts 322 respectively correspond to the two leg parts 22 in any one of the First to Third Embodiments.

In addition, the seat 302 has two seat side members 323 which respectively correspond to the two seat side members 23 in any one of the First to Third Embodiments. The seat 302 has a back plate support mechanism 324 which is configured so as to support the later-described back plate 304 when the seat 302 and the back plate 304 are in a retracting position and a lying-down position respectively.

Figure 16:
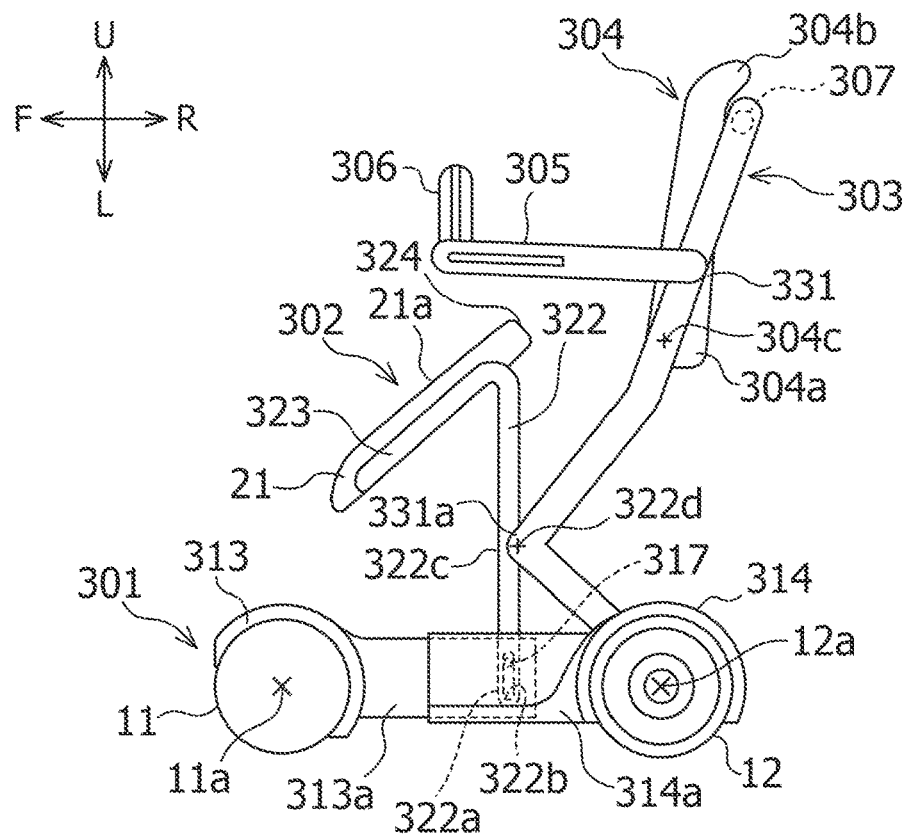
FIG. 16 is a right side view schematically showing the electric vehicle according to the Fifth Embodiment, in the middle state shifting between the unfolded state and the folded state.
Figure 17:
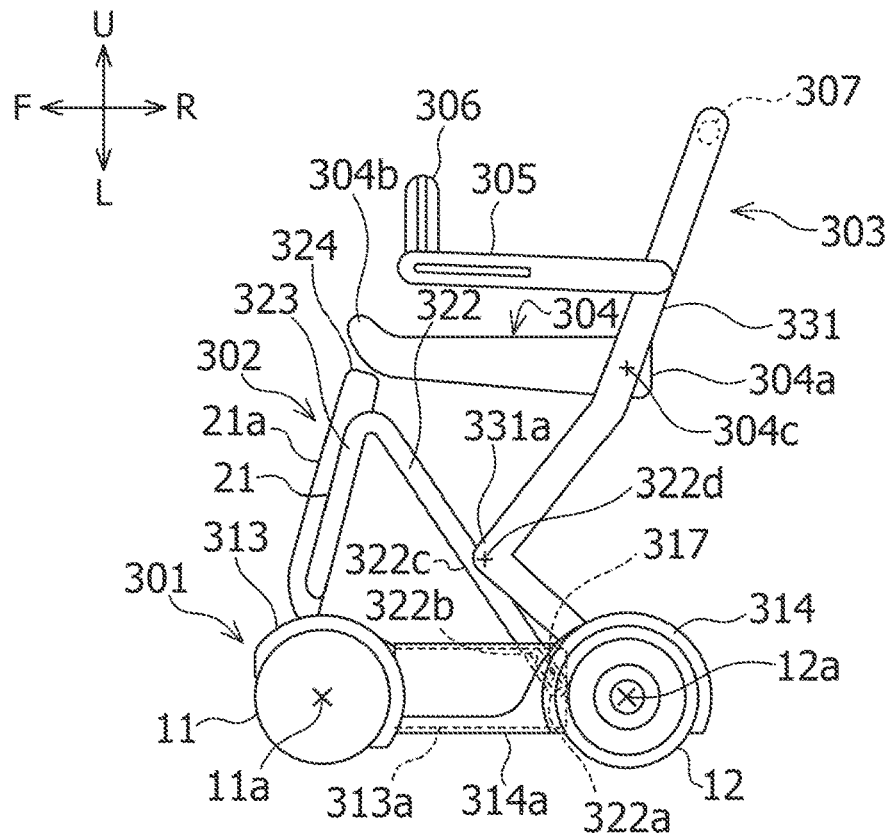
FIG. 17 is a right side view schematically showing the electric vehicle according to the Fifth Embodiment, in the folded state.

Note that in FIG. 16, the back plate support mechanism 324 is a rear end, in a seat front-rear direction, of the seating part 21. However, the present invention is not limited to this. The back plate support mechanism may be formed so as to project downward from each seat side member in a seat upper-lower direction as similarly to each back plate support mechanism in any one of the First to Third Embodiments.

Each leg part 322 may extend so as to incline from the backward toward the forward in a seat front-rear direction in accordance with extension thereof from the upper toward the lower in the seat upper-lower direction. In addition, each leg part 322 may extend toward a lower side in the seat upper-lower direction from a rear end portion, in the seat front-rear direction, of the corresponding seat side member 323.

Each leg part 322 has a base attaching section 322a which is configured so as to attach this leg part 322 to the front base 313. The base attaching section 322a is attached to the pivot shaft 317 of the anterior side members 313a so as to be capable of pivoting. More specifically, the base attaching section 322a has an attaching long hole 322b which penetrates through in a vehicle width direction so as to allow the pivot shaft 317 to be inserted thereinto. The attaching long hole 322b extends along a longitudinal direction of each leg part 322. When the front base 313 moves in the vehicle front-rear direction with respect to the rear base 314, the pivot shaft 317 moves inside the attaching long hole 322b along a longitudinal direction of the attaching long hole 322b.

Although details will be described later, each leg part 322 has a frame attaching section 322c which is configured so as to attach this leg part 322 to the later-described frame 303 so as to be capable of pivoting with respect to the frame 303. The frame attaching section 322c is located between the seating part 21 and the base attaching section 322a. In addition, the base attaching section 322a of each leg part 322 may be located in a lower end, in the seat upper-lower direction, of this leg part 322, and the frame attaching section 322c of each leg part 322 may be located in the middle, in the seat upper-lower direction, of this leg part 322.

Frame

As shown in FIGS. 13 to 17, the electric vehicle according to the present Embodiment has the frame 303 which is configured so as to be the same as the frame 3 in any one of the First to Third Embodiments, except the below-described point. The frame 303 has two supporting posts 331 which respectively correspond to the two supporting posts 31 in any one of the First to Third Embodiments. Each supporting post 331 has a seat pivoting attaching part 331a which is configured so as to allow the corresponding frame attaching section 322c of the leg part 322 to be attached. The frame attaching section 322c is attached to the seat pivoting attaching part 331a so as to be capable of pivoting with the pivot shaft line 322d, which extends in the vehicle width direction, as a center.

The seat pivoting attaching part 331a is located between a front end and a rear end, in the vehicle front-rear direction, of the rear base 314. In particular, the seat pivoting attaching part 331a may be located in a lower region of each supporting post 331 which are located in the vehicle lower with respect to the seating part 21 in the seating position. The lower region of each supporting post 331 may be formed so as to project toward the vehicle front in a substantially triangular shape. In this case, the seat pivoting attaching part 331a may be located in an apex portion of the lower region of each supporting post 331, which projects toward the vehicle front.

Furthermore, although they are not particularly clearly shown, the frame 303 has seat support mechanisms and a coupling member which are respectively the same as the seat support mechanisms 32 and the coupling member 33 in any one of the First to Third Embodiments.

Back Plate

As shown in FIGS. 13 to 17, the electric vehicle according to the present Embodiment has the back plate 304. This back plate 304 has a base end part 304a, a leading end part 304b, and a pivot shaft line 304c which respectively correspond to the base end part 4a, the leading end part 4b, and the pivot shaft line 4c in any one of the First to Third Embodiments. The back plate 304 is configured so as to be the same as the back plate 4 in any one of the First to Third Embodiments, except that the pivot shaft line 304c is located in the base end part 30a.

Armrest and Front and Rear Operating Devices

As shown in FIGS. 13 and 15 to 17, the electric vehicle according to the present Embodiment has armrests 305 which are configured so as to be the same as the armrests 5 in any one of the First to Third Embodiments. The electric vehicle according to the present Embodiment has front and rear operating devices 306 and 307 which respectively correspond to the front operating devices 6 and rear operating devices 7 in any one of the First to Third Embodiments. The electric vehicle has the two armrests 305, the two front operating devices 306, and the two rear operating devices 307.

Each front operating device 306 is configured so as to be the same as the front operating device 6 in any one of the First to Third Embodiments except the below-described point. Each front operating device 306 is a joystick. However, each front operating device is not limited to this. The two front operating devices 306 are respectively attached to front end portions of the two armrests 305. However, the vehicle may have one front operating device which is attached to one of the two armrests. Note that the two front operating devices 306 as mentioned above are applicable to the vehicle in each of the First to Fourth Embodiments.

Each rear operating device 307 is configured so as to be the same as the rear operating device 7 in any one of the First to Third Embodiments, except the below-described point. Each rear operating device 307 is a joystick. However, each rear operating device is not limited to this. Each of the two rear operating devices 307 is respectively attached to each of the two supporting posts 331 of the frame 303. However, each rear operating device may be attached to the coupling member of the frame as in the First to Third Embodiments.

As to relationship of these rear operating devices 307 and the back plate 304, the back plate 304 in the standing-up position is located so as to cover the rear operating devices 307 from the vehicle upper. The leading end part 304b of this back plate 304 is bent from the vehicle front toward the vehicle rear in accordance with extension thereof from the vehicle lower toward the vehicle upper when the back plate 304 is in the standing-up position. However, the back plate is not limited to this. For example, the leading end part of the back plate may incline from the vehicle front toward the vehicle rear in accordance with the extension thereof from the vehicle lower toward the vehicle upper when the back plate is in the standing-up position. Furthermore, the leading end part of the back plate may be formed in a substantially L-shape. Note that the disposition of the back plate 304 is applicable to the disposition of the back plate 4 in the First to Fourth Embodiments.

The vehicle according to the present Embodiment as described above is capable of performing a deformation operation as the same as the one example of the deformation operation performed by the vehicle according to the above-described First Embodiment. Furthermore, by employing the mobile object according to the present Embodiment, in addition to the effects attained by the mobile object according to the aspect of the First Embodiment, effects as described below can be obtained.

In the mobile object according to an aspect of the present Embodiment, each leg part 322 of the seat 302 has the frame attaching section 322c which is configured so as to attach each leg part 322 to the frame 303 so as to allow this leg part 322 to pivot with respect to the frame 303, and the frame attaching section 322c is located between the seating part 21 and the base attaching section 322a. Therefore, since the seating part 21 of the seat 302 can be stably and smoothly moved forward and backward when the mobile object in the unfolded state, the mobile object can be efficiently used. Thus, user-friendliness of the mobile object can be enhanced.

In the electric vehicle according to another aspect of the present Embodiment, the back plate 304 in the standing-up position is located so as to cover the rear operating devices 307 from the vehicle upper. Therefore, when the moving base 301 is in the expanded state, and an occupant is seated on the seat 302 operates the front operating devices 306, access to the rear operating devices 307 by the occupant, can be restricted by the back plate 304. Furthermore, when the moving base 301 is in the expanded state, and operation of the rear operating devices 307 is disabled, unnecessary access to the rear operating devices 307 by the occupant, can be restricted, and as a result, the rear operating devices 307 can be prevented from being damaged.

Hereinbefore, the Embodiments of the present invention are described. However, the present invention is not limited to the above-described Embodiments, and a variety of variations and modifications of the present invention can be made based on the technical idea of the present invention.

REFERENCE SINGS LIST 1, 201, 301 . . . Moving base
11 . . . Front wheel
12 . . . Rear wheel
13, 213, 313 . . . Front base
14, 214, 314 . . . Rear base
2, 302 . . . Seat
21 . . . Seating part
21a . . . Seating surface
22, 322 . . . Leg part
22a, 322a . . . Base attaching section
3, 303 . . . Frame
H . . . Wheel base

The invention claimed is:

1. A mobile object comprising:
a moving base including a front base and a rear base, the front base having a front wheel, the rear base being located rearward with respect to the front base and having a rear wheel; and
a seat including a seating part and a leg part and being located on the moving base, the seating part having a seating surface, the leg part supporting the seating part,
wherein:
the front base and the rear base are configured so as to be movable relative to each other such that a wheel base between the front wheel and the rear wheel can be expanded and contracted,
the moving base is configured so as to be changeable between an expanded state in which the wheel base is expanded, and a contracted state in which the wheel base is contracted so as to be shorter than the moving base in the expanded state,
the seating part is configured so as to be moved forward to a retracting position by movement of the leg part associated with relative movement of the front base and the rear base for contraction of the wheel base, and so as to cause the seating surface to face forward in a condition in which the moving base is in the contracted state, and
the seating part is further configured so as to be moved backward to a seating position by movement of the leg part associated with relative movement of the front base and the rear base for expansion of the wheel base.

2. The mobile object according to claim 1, wherein
the leg part has a base attaching section configured so as to attach the leg part to the front base such that the leg part can pivot with respect to the front base, and
forward movement of the seating part of the seat is provided by backward movement of the base attaching section of the leg part and forward pivoting of the leg part in association with backward movement of the front base for contraction of the wheel base, and backward movement of the seating part is provided by forward movement of the base attaching section of the leg part and backward pivoting of the leg part in association with forward movement of the front base for expansion of the wheel base.

3. The mobile object according to claim 2, further comprising a frame located behind the seat on the rear base, wherein
the leg part has a frame attaching section configured so as to attach the leg part to the frame such that the leg part can pivot with respect to the frame, and
the frame attaching section is located between the seating part and the base attaching section.

4. The mobile object according to claim 1, further comprising a frame located behind the seat on the rear base, wherein
the seating part of the seat is configured so as to cause the seating surface to face upward in a condition in which the moving base is in the expanded state, and
the frame is configured so as to support the seating part in a condition in which the moving base is in the expanded state.

* * * * *